US011822732B1

(12) United States Patent
Zhu et al.

(10) Patent No.: US 11,822,732 B1
(45) Date of Patent: Nov. 21, 2023

(54) INTERACTIVE WEARABLE DEVICE AND METHOD OF MACHINE LEARNING BASED TRAINING THEREOF

(71) Applicant: City University of Hong Kong, Hong Kong (HK)

(72) Inventors: Kening Zhu, Hong Kong (HK); Taizhou Chen, Hong Kong (HK); Tianpei Li, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 0 days.

(21) Appl. No.: 18/169,223

(22) Filed: Feb. 15, 2023

(51) Int. Cl.
    *G06F 3/01*     (2006.01)
    *G06N 5/022*     (2023.01)
    *G06F 3/033*     (2013.01)

(52) U.S. Cl.
    CPC .............. *G06F 3/017* (2013.01); *G06F 3/014* (2013.01); *G06F 3/033* (2013.01); *G06N 5/022* (2013.01); *G06F 2203/0331* (2013.01)

(58) Field of Classification Search
None
See application file for complete search history.

(56) References Cited

U.S. PATENT DOCUMENTS

| 6,859,141 | B1 | 2/2005 | Van Schyndel et al. | |
|---|---|---|---|---|
| 10,139,906 | B1 * | 11/2018 | Bai | G06F 3/014 |
| 10,310,632 | B2 * | 6/2019 | Nirjon | G06F 3/0236 |
| 2016/0034742 | A1 * | 2/2016 | Kim | G06V 40/1365 |
| | | | | 382/124 |

OTHER PUBLICATIONS

Yilin Liu et al. NeuroPose: 3D Hand Pose Tracking Using EMG Wearables. The Web Conference 2021—Proceedings of the World Wide Web Conference, WWW 2021 (2021), 1471-1482.
Arnold M Lund, Measuring Usability with the USE Questionnaire. Usability interface 8, 2 (2001), 3-6.
I Scott MacKenzie. 1992. Fitts' Law as a Research and Design Tool in Human-Computer Interaction. Human-computer interaction 7, 1 (1992), 91-139.

(Continued)

*Primary Examiner* — Christopher J Kohlman
(74) *Attorney, Agent, or Firm* — Idea Intellectual Limited; Margaret A. Burke; Sam T. Yip

(57) ABSTRACT

An interactive wearable device includes a ring body and a detector. The ring body includes a top insulating layer, a bottom insulating layer, and an intermediate insulating layer disposed in between the top and the bottom insulating layers. The detector includes a receiving electrode layer disposed in between the top and the intermediate insulating layers, a transmitting electrode layer disposed in between the intermediate and the bottom insulating layers, and a ground electrode layer embedding in the bottom insulating layer and electrically coupled to an electrical ground. The receiving electrode layer has a plurality of receiving electrode portions separated from each other and arranged in a matrix and along a curve path. The interactive wearable device is configured to analyze the movement event at least according to a variation of a data set in response to the movement event, measured by receiving electrode portions.

19 Claims, 18 Drawing Sheets

(56) References Cited

OTHER PUBLICATIONS

Denys JC Matthies et al. CapGlasses: Untethered Capacitive Sensing with Smart Glasses. In Augmented Humans Conference 2021. 121-130.

Miranda McClellan et al. Deep Learning at the Mobile Edge: Opportunities for 5G Networks. Applied Sciences 10, 14 (2020), 4735.

MicroChip. 2022. ATUSB-GESTIC-PCB. Retrieved Aug. 10, 2022 from https://www.microchip.com/en-us/development-tool/EV91M41A.

MicroChip. 2022. MGC3130 Datasheet. Retrieved Aug. 10, 2022 from https://www.microchip.com/en-us/product/MGC3130.

Franziska Mueller et al. Real-time Pose and Shape Reconstruction of Two Interacting Hands With a Single Depth Camera. ACM Transactions on Graphics 38, 4 (2019).

Adiyan Mujibiya et al. Mirage: Exploring Interaction Modalities Using Off-Body Static Electric Field Sensing. UIST 2013—Proceedings of the 26th Annual ACM Symposium on User Interface Software and Technology (2013), 211-220.

Arshad Nasser et al. FingerTalkie: Designing A Low-cost Finger-worn Device for Interactive Audio Labeling of Tactile Diagrams. In Human-Computer Interaction. Multimodal and Natural Interaction, Masaaki Kurosu (Ed.). Springer International Publishing, Cham, 475-496.

Viet Nguyen et al. HandSense: Capacitive coupling-based Dynamic, Micro Finger Gesture Recognition. SenSys 2019—Proceedings of the 17th Conference on Embedded Networked Sensor Systems (2019), 285-297.

J. Rekimoto. GestureWrist and GesturePad: Unobtrusive Wearable Interaction Devices. International Symposium on Wearable Computers, Digest of Papers (2001), 21-27.

Thijs Roumen et al. NotiRing: A Comparative Study of Notification Channels for Wearable Interactive Rings. Conference on Human Factors in Computing Systems—Proceedings (2015), 2497-2500.

Shardul Sapkota et al. Ubiquitous Interactions for Heads-Up Computing: Understanding Users' Preferences for Subtle Interaction Techniques in Everyday Settings. In Proceedings of the 23rd International Conference on Mobile Human-Computer Interaction (2021), 36, 15.

Yilei Shi et al. Ready, Steady, Touch!—Sensing Physical Contact with a Finger-Mounted IMU. Proceedings of the ACM on Interactive, Mobile, Wearable and Ubiquitous Technologies 4 (2020), 1-25.

Karen Simonyan et al. Very Deep Convolutional Networks for Large-Scale Image Recognition. arXiv preprint arXiv:1409.1556 (2014).

Joshua Smith et al. Electric Field Sensing For Graphical Interfaces. IEEE Computer Graphics and Applications 18, 3 (1998), 54-59.

Christian Szegedy et al. Rethinking the Inception Architecture for Computer Vision. Proceedings of the IEEE Computer Society Conference on Computer Vision and Pattern Recognition (2016), 2818-2826.

Jonathan Tompson et al. Real-Time Continuous Pose Recovery of Human Hands Using Convolutional Networks. ACM Transactions on Graphics 33, 5 (2014).

Hsin-Ruey Tsai et al. TouchRing: Subtle and Always-Available Input Using a Multi-touch Ring. In The ACM International Conference on Mobile Human-Computer Interaction. (2016), 891-898.

Hsin Ruey Tsai et al. ThumbRing: Private Interactions Using One-Handed Thumb Motion Input on Finger Segments. Proceedings of the 18th International Conference on Human-Computer Interaction with Mobile Devices and Services Adjunct, MobileHCI 2016 (2016), 791-798.

Hsin-Ruey Tsai et al. SegTouch: Enhancing Touch Input While Providing Touch Gestures on Screens Using Thumb-To-Index-Finger Gestures. Proceedings of the 2017 CHI Conference Extended Abstracts on Human Factors in Computing Systems (2017), 2164-2171.

Radu-Daniel Vatavu et al. GestuRING: A Web-based Tool for Designing Gesture Input with Rings, Ring-Like, and Ring-Ready Devices. Association for Computing Machinery, (2021), 710-723.

Robert Y. Wang et al. Real-Time Hand-Tracking with a Color Glove. ACM Transactions on Graphics 28, 3 (2009), 1-8.

Saiwen Wang et al. Interacting with Soli: Exploring Fine-Grained Dynamic Gesture Recognition in the Radio-Frequency Spectrum. UIST 2016—Proceedings of the 29th Annual Symposium on User Interface Software and Technology (2016), 851-860.

Eric Whitmire et al. DigiTouch: Reconfigurable Thumb-to-Finger Input and Text Entry on Head-mounted Displays. Proceedings of the ACM on Interactive, Mobile, Wearable and Ubiquitous Technologies 1, 3 (2017), 1-21.

Mathias Wilhelm et al. PeriSense: Ring-Based Multi-Finger Gesture Interaction Utilizing Capacitive Proximity Sensing. Sensors (Switzerland) 20, 14 (2020), 1-23.

Mathias Wilhelm et al. eRing: Multiple Finger Gesture Recognition with one Ring Using an Electric Field. ACM International Conference Proceeding Series Jun. 25-26, 2015, 1-6.

Erwin Wu et al. Back-Hand-Pose: 3D Hand Pose Estimation for a Wrist-Worn Camera via Dorsum Deformation Network. UIST 2020—Proceedings of the 33rd Annual ACM Symposium on User Interface Software and Technology (2020), 1147-1160.

Xuhai Xu et al. EarBuddy: Enabling On-Face Interaction via Wireless Earbuds. Association for Computing Machinery, (2020), 1-14.

Zheer Xu et al. 2020. BiTipText: Bimanual Eyes-Free Text Entry on a Fingertip Keyboard. Conference on Human Factors in Computing Systems—Proceedings (2020), 1-14.

Zheer Xu et al. TipText: Eyes-Free Text Entry on a Fingertip Keyboard. UIST 2019—Proceedings of the 32nd Annual ACM Symposium on User Interface Software and Technology (2019), 883-889.

Yui-Pan Yau et al. How Subtle Can It Get? A Trimodal Study of Ring-sized Interfaces for One-Handed Drone Control. Proceedings of the ACM on Interactive, Mobile, Wearable and Ubiquitous Technologies 4, 2 (2020).

Sang Ho Yoon et al. TIMMi: Finger-worn Textile Input Device with Multimodal Sensing in Mobile Interaction. Proceedings of the 9th International Conference on Tangible, Embedded, and Embodied Interaction January (2015), 269-272.

Chaoyun Zhang et al. Deep Learning in Mobile and Wireless Networking: A Survey. IEEE Communications Surveys & Tutorials 21, 3 (2019), 2224-2287.

Cheng Zhang et al. FingerSound: Recognizing unistroke thumb gestures using a ring. Proceedings of the ACM on Interactive, Mobile, Wearable and Ubiquitous Technologies 1, 3 (2017), 1-19.

Cheng Zhang et al. FingerPing: Recognizing Fine-grained Hand Poses using Active Acoustic On-body Sensing. Conference on Human Factors in Computing Systems—Proceedings 2018—Apr. 2018, 1-10.

Xu Zhang et al. Hand Gesture Recognition and Virtual Game Control Based on 3D Accelerometer and EMG Sensors. International Conference on Intelligent User Interfaces, Proceedings IUI (2008), 1-5.

Junhan Zhou et al. AuraSense : Enabling Expressive Around-Smartwatch Interactions with Electric Field Sensing. UIST 2016—Proceedings of the 29th Annual ACM Symposium on User Interface Software and Technology Figure 1 (2016), 81-86.

Kening Zhu et al. A sense of ice and fire: Exploring thermal feedback with multiple thermoelectric-cooling elements on a smart ring. International Journal of Human Computer Studies 130, (2019), 234-247.

Thomas G. Zimmerman et al. Applying Electric Field Sensing to Human-Computer Interfaces. Conference on Human Factors in Computing Systems—Proceedings 1, May 1995, 280-287.

Kazuyuki Arimatsu et al. Evaluation of Machine Learning Techniques for Hand Pose Estimation on Handheld Device with Proximity Sensor. Conference on Human Factors in Computing Systems—Proceedings (2020), 1-13.

Sandra Bardot et al. ARO: Exploring the Design of Smart-Ring Interactions for Encumbered Hands. Proceedings of MobileHCI 2021—ACM International Conference on Mobile Human-Computer Interaction: Mobile Apart, MobileTogether (2021).

(56) References Cited

OTHER PUBLICATIONS

Hymalai Bello et al. MoCapaci: Posture and gesture detection in loose garments using textile cables as capacitive antennas. Proceedings—International Symposium on Wearable Computers, ISWC (2020), 78-83.
Xiaojun Bi et al. FFitts Law: Modeling finger Touch with Fitts' Law. Conference on Human Factors in Computing Systems—Proceedings (2013).
Roger Boldu et al. Thumb-In-Motion: Evaluating Thumb-to-Ring Microgestures for Athletic Activity. SUI 2018—Proceedings of the Symposium on Spatial User Interaction (2018), 150-157.
T. Caliński et al. A Dendrite Method for Cluster Analysis. Communications in Statistics—Theory and Methods 3, 1 (1974), 1-27.
Liwei Chan et al. CyclopsRing: Enabling Whole-Hand and Context-Aware Interactions Through a Fisheye Ring. UIST 2015—Proceedings of the 28th Annual ACM Symposium on User Interface Software and Technology 1 (2015), 549-556.
Liwei Chan et al. FingerPad: Private and Subtle Interaction Using Fingertips. (2013), 255-260.
Chih-Chung Chang et al. LIBSVM: A Library for Support Vector Machines. ACM Transactions on Intelligent Systems and Technology 2 (2011), 27:1-27:27. Issue 3.
Ke-Yu Chen et al. Finexus: Tracking Precise Motions of Multiple Fingertips Using Magnetic Sensing. Conference on Human Factors in Computing Systems—Proceedings (2016), 1504-1514.
Taizhou Chen et al. GestOnHMD: Enabling Gesture-based Interaction on Low-cost VR Head-Mounted Display. IEEE Transactions on Visualization and Computer Graphics 27, 5 (2021), 2597-2607.
Gabe Cohn et al. Humantenna: Using the Body as an Antenna for Real-Time Whole-Body Interaction. Conference on Human Factors in Computing Systems—Proceedings (2012), 1901-1910.
Rajkumar Darbar et al. RingloT: A Smart Ring Controlling Things in Physical Spaces. May 2019, 2-9.
Alexey Dosovitskiy et al. An Image is Worth 16X16 Words: Transformers for Image Recognition at Scale. arXiv preprint arXiv:2010.11929 (2020).
Christoph Endres et al. "Geremin": 2D Microgestures for Drivers Based on Electric Field Sensing. International Conference on Intelligent User Interfaces, Proceedings IUI Jun. 2014 (2011), 327-330.
Paul M. Fitts. The Information Capacity of the Human Motor System in Controlling the Amplitude of Movement. Journal of experimental psychology 47, 6 (1954), 381-391.
Masaaki Fukumoto et al. "FingeRing": A Full-Time Wearable Interface. Conference on Human Factors in Computing Systems—Proceedings 1994—Apr., May 1994, 81-82.
Oliver Glauser et al. Deformation Capture via Soft and Stretchable Sensor Arrays. ACM Trans. Graph 38, 2 (2019), 1-16.
Oliver Glauser et al. Interactive Hand Pose Estimation using a Stretch-Sensing Soft Glove. SACM Transactions on Graphics (Proceedings of ACM SIGGRAPH) 38, 4 (2019), 15.
Mathieu Le Goc et al. A Low-cost Transparent Electric Field Sensor for 3D Interaction on Mobile Devices. Conference on Human Factors in Computing Systems—Proceedings Apr. 2014, 3167-3170.
Jun Gong et al. Pyro: Thumb-Tip Gesture Recognition Using Pyroelectric Infrared Sensing. UIST 2017—Proceedings of the 30th Annual ACM Symposium on User Interface Software and Technology (2017), 553-563.
Tobias Grosse-Puppendahl et al. OpenCapSense: A Rapid Prototyping Toolkit For Pervasive Interaction Using Capacitive Sensing. 2013 IEEE International Conference on Pervasive Computing and Communications, PerCom 2013 Mar. 2013, 152-159.
Tobias Grosse-Puppendahl et al. Honeyfish—a high resolution gesture recognition system based on capacitive proximity sensing. Embedded World Conference 2012 Jan. 2012, 10.
Tobias Grosse-Puppendahl et al. Finding Common Ground: A Survey of Capacitive Sensing in Human-Computer Interaction. Conference on Human Factors in Computing Systems—Proceedings 2017—May 2017, 3293-3316.
Changzhan Gu et al. A Two-Tone Radar Sensor for Concurrent Detection of Absolute Distance and Relative Movement for Gesture Sensing. IEEE Sensors Letters 1, 3 (2017), 1-4.
Yizheng Gu et al. Accurate and Low-Latency Sensing of Touch Contact on Any Surface with Finger-Worn IMU Sensor. UIST 2019—Proceedings of the 32nd Annual ACM Symposium on User Interface Software and Technology (2019), 1059-1070.
Gaël Guennebaud et al. 2010. Eigen v3. http://eigen.tuxfamily.org.
Tian Guo. Cloud-based or On-device: An Empirical Study of Mobile Deep Inference. In 2018 IEEE International Conference on Cloud Engineering (IC2E). IEEE, (2018), 184-190.
Shangchen Han et al. MEgATrack: Monochrome Egocentric Articulated Hand-Tracking for Virtual Reality. ACM Transactions on Graphics 39, 4 (2020).
Kaiming He et al. Deep Residual Learning for Image Recognition. In Proceedings of the IEEE Conference on Computer Vision and Pattern Recognition, (2016), 770-778.
Mikko Heino et al. Recent Advances in Antenna Design and Interference Cancellation Algorithms for In-Band Full Duplex Relays. IEEE Communications Magazine 53, 5 (2015), 91-101.
Anuradha Herath et al. Expanding Touch Interaction Capabilities for Smart-rings: An Exploration of Continual Slide and Microroll Gestures. In CHI Conference on Human Factors in Computing Systems Extended Abstracts, (2022), 1-7.
Fang Hu et al. FingerTrak: Continuous 3D Hand Pose Tracking by Deep Learning Hand Silhouettes Captured by Miniature Thermal Cameras on Wrist. Proceedings of the ACM on Interactive, Mobile, Wearable and Ubiquitous Technologies 4, 2 (2020).
Da Yuan Huang et al. DigitSpace: Designing Thumb-to-Fingers Touch Interfaces for One-Handed and Eyes-Free Interactions. Conference on Human Factors in Computing Systems—Proceedings (2016), 1526-1537.
Gao Huang et al. Densely Connected Convolutional Networks. In Proceedings of the IEEE Conference on Computer Vision and Pattern Recognition, (2017), 4700-4708.
Seungwoo Je et al. PokeRing: Notifications by Poking Around the Finger. Conference on Human Factors in Computing Systems—Proceedings (2018), 1-10.
Seungwoo Je et al. tactoRing: A Skin-Drag Discrete Display. Conference on Human Factors in Computing Systems—Proceedings 2017—May 2017, 3106-3114.
Rudolph Emil Kalman. A New Approach to Linear Filtering and Prediction Problems. (1960).
Wolf Kienzle et al. LightRing: Always-Available 2D Input on Any Surface. UIST 2014—Proceedings of the 27th Annual ACM Symposium on User Interface Software and Technology (2014), 157-160.
Wolf Kienzle et al. Electroring: Subtle Pinch and Touch Detection with a Ring. Conference on Human Factors in Computing Systems—Proceedings (2021).
David Kim et al. Digits: Freehand 3D Interactions Anywhere Using a Wrist-Worn Gloveless Sensor. UIST'12—Proceedings of the 25th Annual ACM Symposium on User Interface Software and Technology (2012), 167-176.
Jonghwa Kim et al. EMG-based Hand Gesture Recognition for Realtime Biosignal Interfacing. International Conference on Intelligent User Interfaces, Proceedings IUI (2008), 30-39.
Diederik P. Kingma et al. ADAM: A Method for Stochastic Optimization. 3rd International Conference on Learning Representations, ICLR 2015—Conference Track Proceedings (2015), 1-15.
George Frederick Kunz. 2012. Rings for the Finger. Courier Corporation.
Gierad Laput et al. SurfaceSight: A New Spin on Touch, User, and Object Sensing for IoT Experiences. In Proceedings of the 2019 CHI Conference on Human Factors in Computing Systems (2019).
Gierad Laput et al. ViBand: High-Fidelity Bio-Acoustic Sensing Using Commodity Smartwatch Accelerometers. UIST 2016—Proceedings of the 29th Annual Symposium on User Interface Software and Technology (2016), 321-333.
Chen Liang et al. DualRing: Enabling Subtle and Expressive Hand Interaction with Dual IMU Rings. Proceedings of the ACM on Interactive, Mobile, Wearable and Ubiquitous Technologies 5, 3 (2021).

(56) References Cited

OTHER PUBLICATIONS

Jaime Lien et al. Soli: Ubiquitous Gesture Sensing with Millimeter Wave Radar. ACM Transactions on Graphics 35, 4 (2016), 1-19.
Hyunchul Lim et al. Touch+Finger: Extending Touch-Based User Interface Capabilities with "Idle" Finger Gestures in the Air. In Proceedings of the 31st Annual ACM Symposium on User Interface Software and Technology, (2018), 335-346.
Guanhong Liu et al. Keep the Phone in Your Pocket: Enabling Smartphone Operation with an IMU Ring for Visually Impaired People. Proceedings of the ACM on Interactive, Mobile, Wearable and Ubiquitous Technologies 4, 2 (2020).

* cited by examiner

FIG. 10

(a) Regression results on the generic models.

| Models | k-NN | $\epsilon$-SVR | MLP |
|---|---|---|---|
| MSE↓ | 3.8% | 3.5% | 4.8% |
| $2^{nd}$ Derivative↓ | $1.24 \times 10^{-3}$ | $1.77 \times 10^{-4}$ | $9.39 \times 10^{-5}$ |

(b) Regression results on the personalized models.

| Models | k-NN | $\epsilon$-SVR | MLP |
|---|---|---|---|
| MSE↓ | 3.5% | 2.3% | 4.5% |
| $2^{nd}$ Derivative↓ | $8.26 \times 10^{-4}$ | $2.74 \times 10^{-4}$ | $3.13 \times 10^{-4}$ |

FIG. 14

INTERACTIVE WEARABLE DEVICE AND METHOD OF MACHINE LEARNING BASED TRAINING THEREOF

Field of the Invention:

The present invention generally relates to an interactive wearable device and machine learning (ML) based training methods to train the interactive wearable device. More specifically the present invention relates to the interactive wearable device using electric field sensing technology and the ML based training methods to train the interactive wearable device for recognizing and continuous tracking of known microgestures and thumb's position of the wearer.

BACKGROUND OF THE INVENTION:

Thumb-to-index-finger (T2I) microgesture interaction, such as tapping, rubbing, and circling with the thumb on the index finger, has shown a wide range of applications and benefits in natural, efficient, and privacy-preserving wearer input interfaces. It can be applied to text input, mobile interaction, drone controlling, Internet of Things (IoT), and AR/VR interaction. Thumb gesturing on an index-finger pad is akin to operating a touchable surface (e.g., touch screen) with an index finger. Compared with performing gestures in suspension or on other large surfaces, T2I microgesture interaction could potentially support more simple and privacy-preserving wearer-machine interactions with less physical demand.

Attracting increasing research interest in recent years, detecting T2I microgestures is considered to be a challenging problem due to the small range and the occlusion problem associated with thumb motions. Recent researches have proposed to use different sensors and recognition methods to support such type of wearer inputs, including millimeter-wave radar, front-facing passive infrared (PIR) sensors, RGB Camera, on-thumb motion sensors, magnetic sensors, and touch-sensitive foils.

However, some of these existing detectors for detecting T2I microgestures are not suitable for wearers due to their large size and/or insufficient accuracy. Therefore, there is a need to develop a new detector to address the aforesaid issues.

SUMMARY OF THE INVENTION:

It is an objective of the present invention to provide an interactive wearable device for recognizing and analyzing a movement event caused by two or more fingers of a wearer of the interactive wearable device, and machine learning (ML) based methods to train the interactive wearable device.

In accordance with one embodiment of a first aspect of the present invention, the interactive wearable device includes a ring body and a detector. The ring body includes a top insulating layer, a bottom insulating layer, and an intermediate insulating layer disposed in between the top and the bottom insulating layers. The detector includes a receiving electrode layer disposed in between the top and the intermediate insulating layers, a transmitting electrode layer disposed in between the intermediate and the bottom insulating layers, and a ground electrode layer embedding in the bottom insulating layer and electrically coupled to an electrical ground. The receiving electrode layer has a plurality of receiving electrode portions separated from each other, and the receiving electrode portions thereof are arranged in a matrix and along a curve path. The interactive wearable device is configured to analyze the movement event at least according to a variation of a data set in response to the movement event, measured by receiving electrode portions.

In accordance with another embodiment, the ring body is configured to wear on the first finger, such that the receiving electrode portions of the receiving electrode layer are arranged around the first finger along the curved path during the movement event.

In accordance with a second aspect of the present invention, a machine learning (ML) based training method to train a wearable device for recognizing one or more known microgestures by two different fingers includes the following steps.

Step 1: One or more microgesture training data sets in response to the known one or more microgestures is measured by a plurality of separated receiving electrode portions of the wearable device arranged in a matrix and along a curve path.

Step 2: a channel-wise gradient operation is performed, by a processor of the wearable device, on each of the microgesture training data sets, so as to extract a channel-wise gradient feature set in response to the corresponding known microgesture.

Step 3: a temporal gradient operation is performed, by the processor of the wearable device, on each of the microgesture training data sets, so as to extract a temporal gradient feature set in response to the corresponding known microgesture.

Step 4: a final feature set in response to the corresponding known microgesture is determined according to at least one of the corresponding channel-wise gradient feature set and the corresponding temporal gradient feature set.

Step 5: a ML model is trained, by the processor, with the final feature sets, such that the wearable device is enable to recognize the known microgestures in response to the final feature sets through the ML model.

In accordance with one embodiment of the present invention, each of the microgesture training data sets comprises a plurality of gesture samples, each of the gesture samples comprises N measurement frames, and each of the measurement frames comprises a plurality of electrical output signals measured by the receiving electrode portions, respectively.

In accordance with a second aspect of the present invention, a machine learning (ML) based training method to train a wearable device for recognizing one or more known microgestures by two different fingers includes the following steps.

Step 6: during a period of performing the 1D continuous movement by the different wearers, a plurality of 1D-continuous-movement training data sets in response to the different wearers, respectively, are measured, by a plurality of separated receiving electrode portions of the wearable device arranged along a curve path.

Step 7: a sliding window operation on each of the 1D-continuous-movement training data sets with a sliding window frame is performed, by a processor of the wearable device, in which the sliding window frame is moved across each of the 1D-continuous-movement training data sets during the sliding window operation.

Step 8: a channel-wise gradient operation is performed, by the processor of the wearable device, on the sliding window frame to extract a feature vector at different times during the sliding window operation, such that a feature set including the feature vectors is obtained.

Step 9: a ML regression model is trained, by the processor, with the feature sets, such that the wearable device is enable to provide a regression result of estimating about a position of the thumb finger on the index finger during a period of performing the 1D continuous movement.

BRIEF DESCRIPTION OF THE DRAWINGS:

Embodiments of the invention are described in more details hereinafter with reference to the drawings, in which:

FIG. 10 shows a testing accuracy of each of the known microgestures with different models and under different evaluation;

FIG. 14 shows a result of mean squared error (MSE) of each regression model.

DETAILED DESCRIPTION:

In the following description, an interactive wearable device, and machine learning based training methods of training the interactive wearable device and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Detailed Configuration about the interactive wearable device 100

Figure 1A:
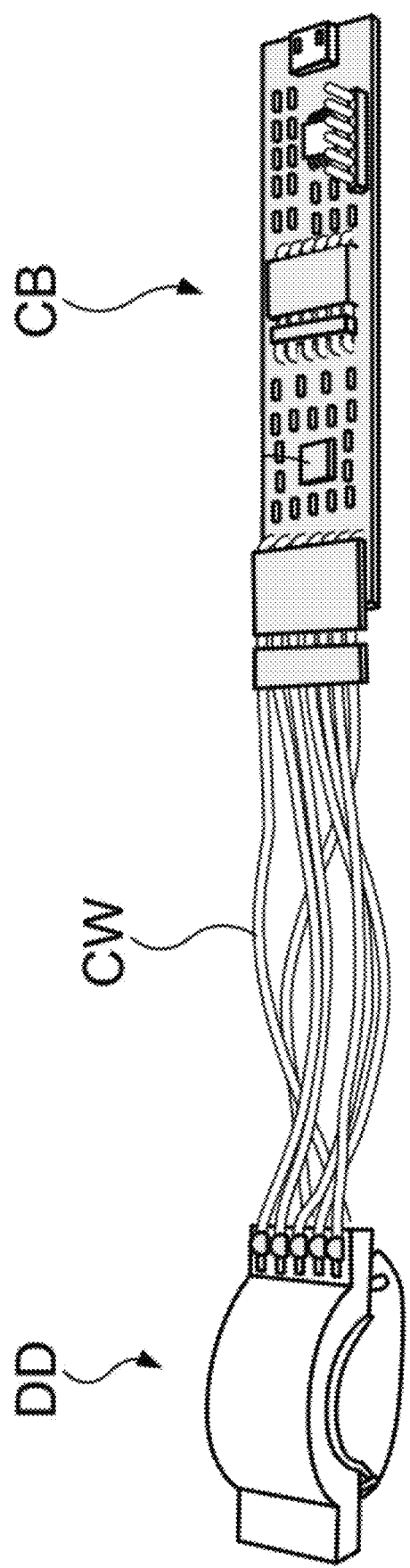
FIG. 1A depicts a schematic diagram of an exterior of an interactive microgesture recognition device according to an embodiment of the present invention.
Figure 1B:
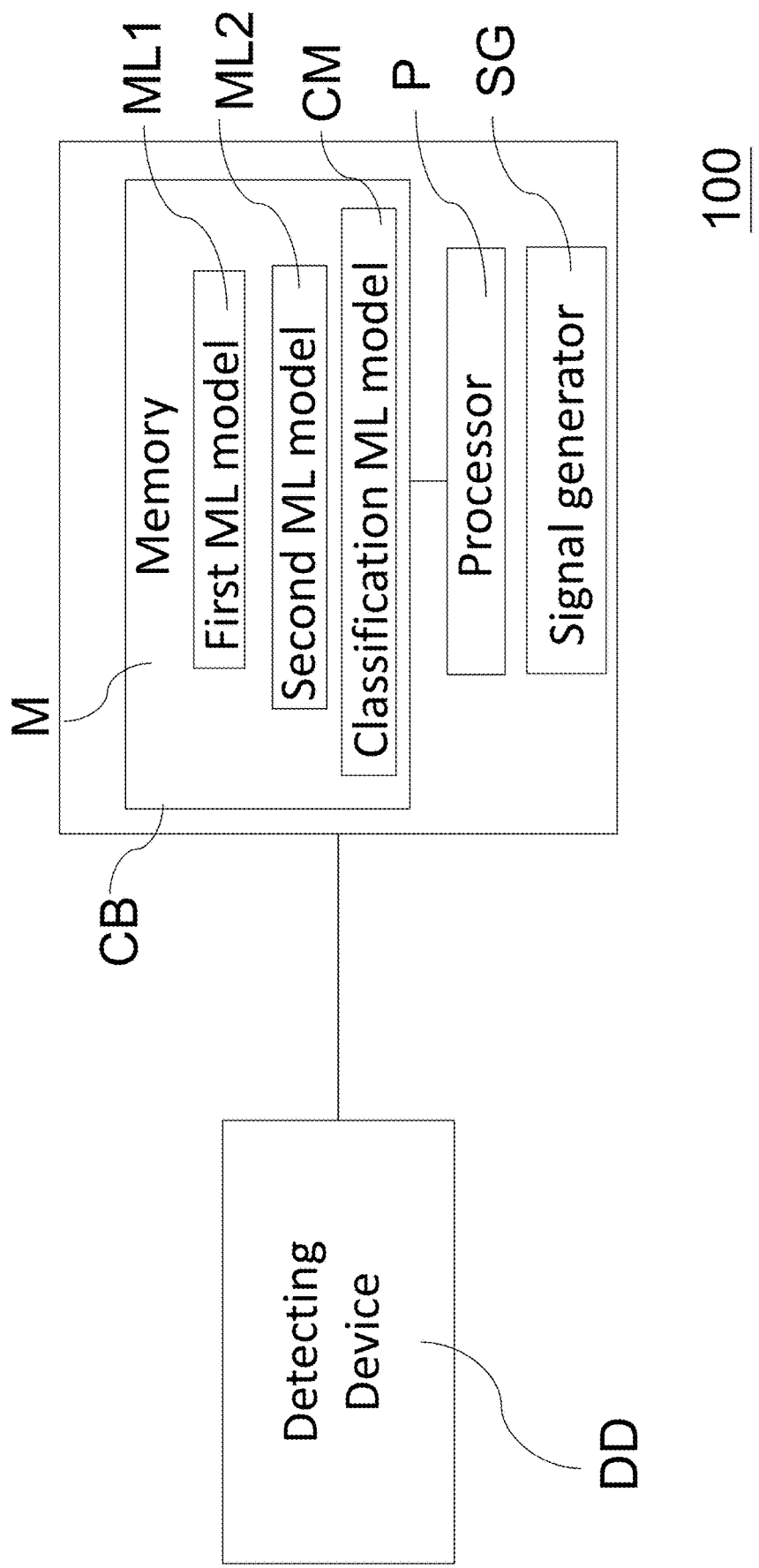
FIG. 1B depicts a circuit block diagram of the interactive microgesture recognition device in the FIG. 1A.
Figure 2:
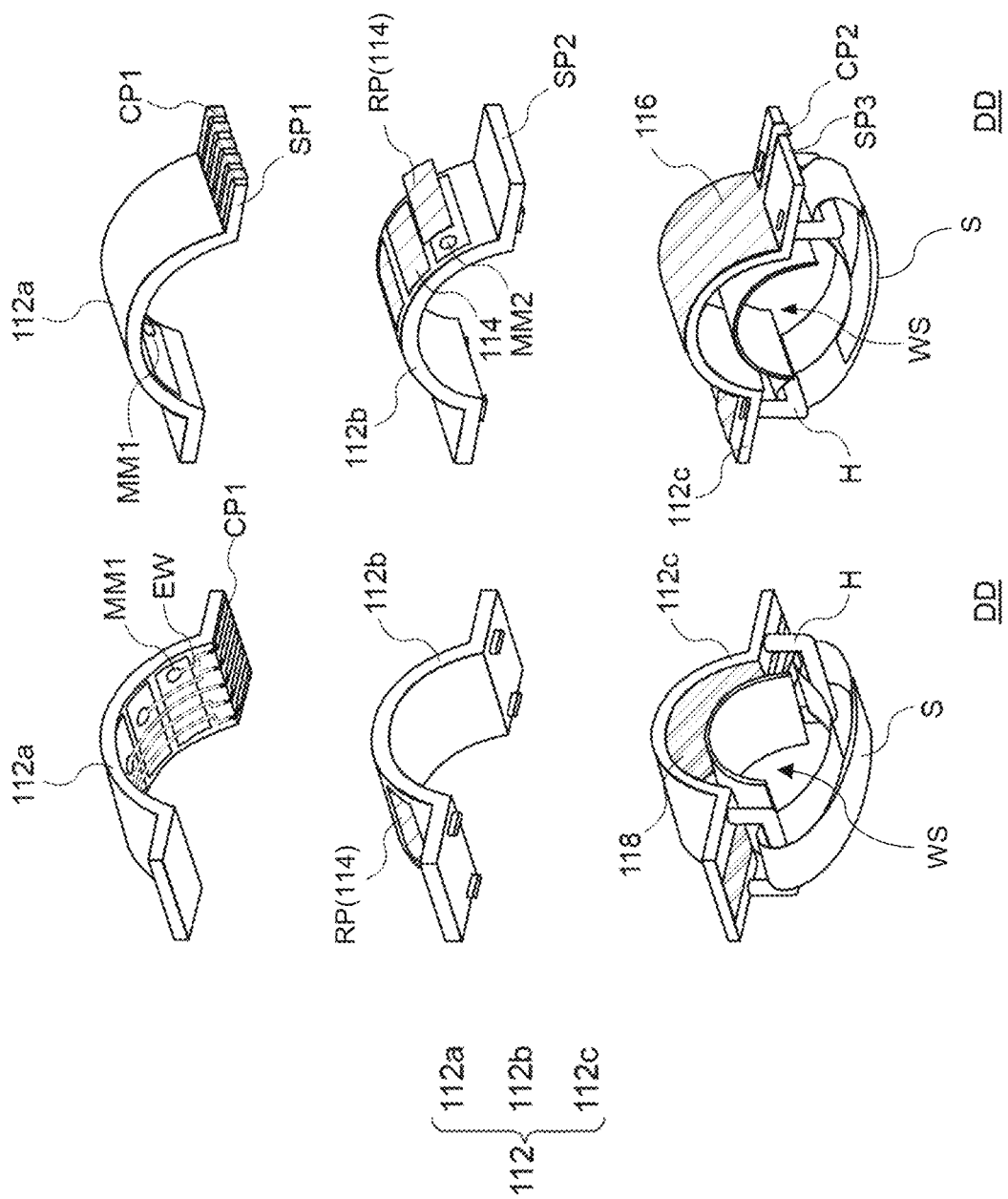
FIG. 2 depicts schematic diagrams of the interactive microgesture recognition device in the FIG. 1A under different visual angles.
Figure 3:
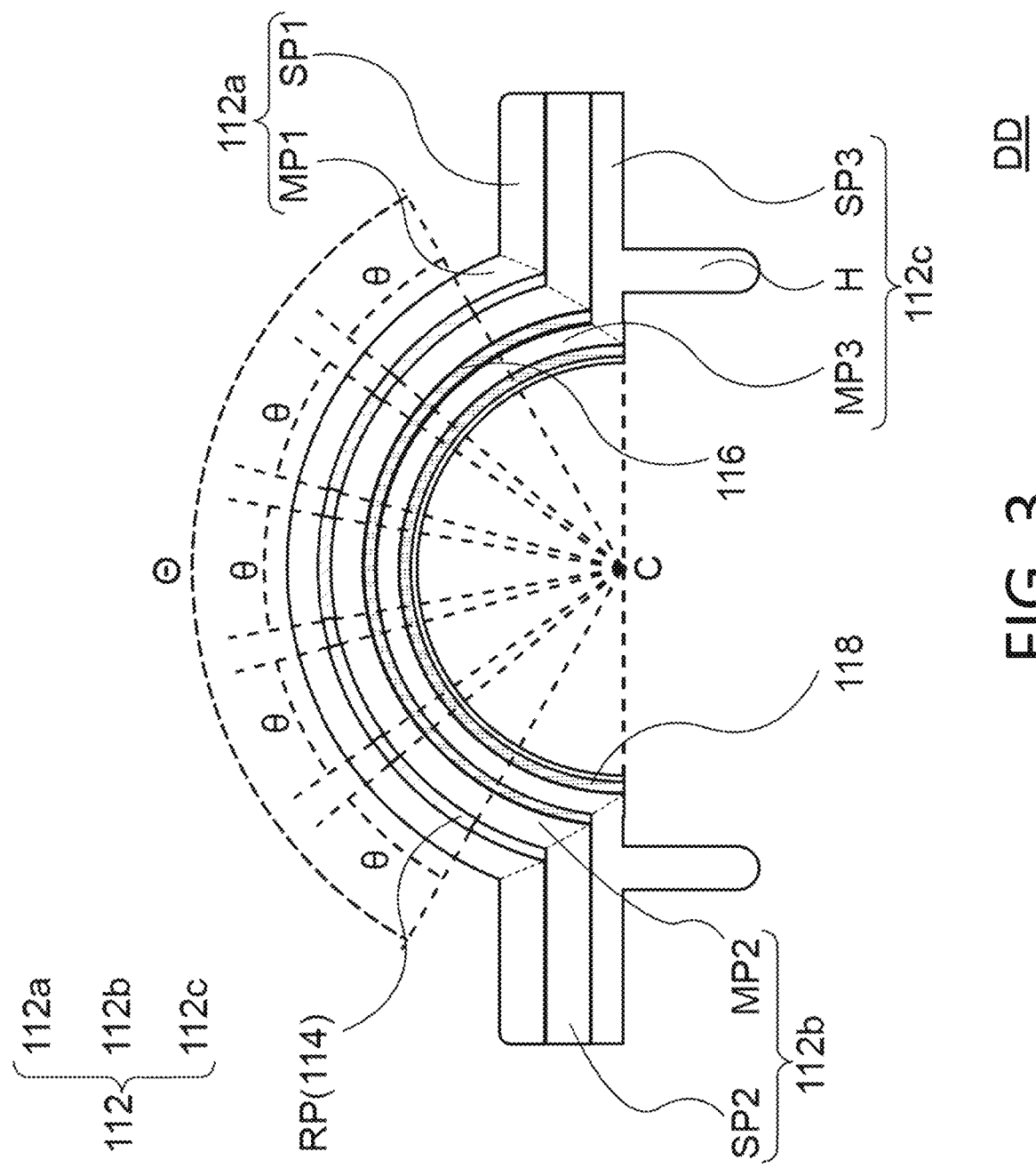
FIG. 3 depicts a vertical cross-sectional view of a detector of the interactive microgesture recognition device in the FIG. 1A.

FIG. 1A depicts a schematic diagram of an exterior of an interactive wearable device 100 according to an embodiment of the present invention. FIG. 1B depicts a block diagram of the interactive wearable device 100 according to an embodiment of the present invention. FIG. 2 depicts an exploded view of the interactive wearable device 100 in the FIG. 1A under different visual angles. FIG. 3 depicts a vertical cross-sectional view of the detector DD.

Referring to the FIG. 1A, in the embodiment, an interactive wearable device 100 includes a detector DD, a circuit board CB, and a plurality of conductive wires CW. Referring to FIGS. 1A and 1B, the detector DD is electrically coupled to the circuit board CB through the conductive wires CW. The circuit board CB includes a processor P, a memory M coupled to the processor P and a signal generator SG. Referring to FIGS. 2 and 3, the detector DD includes a ring body 112, a receiving electrode layer 114, a transmitting electrode layer 116, a ground electrode layer 118, a strap S, a plurality of separated conductive electrode portions CP1, a conductive electrode portion CP2, a plurality of enameled wires EW, and a plurality of magnetic elements MM1, MM2. The aforesaid elements and the arrangement therebetween will be fully described as follows.

Referring to FIGS. 2 and 3, the ring body 112 includes a top insulating layer 112a, an intermediate insulating layer 112b, and a bottom insulating layer 112c. The intermediate insulating layer 112b is disposed in between the top and the bottom insulating layers 112a, 112b. The intermediate insulating layer 112c is conformally stacked on the bottom insulating layer 112b. The top insulating layer 112a is conformally stacked on the intermediate insulating layer 112c.

To be more specifically, each of the insulating layers 112a, 112b, 112c has a middle portion and a pair of side portions connecting to the middle portion thereof. The middle portion MP1 of the top insulating layer 112a, the middle portion MP2 of the intermediate insulating layer 112b, and the middle portion MP3 of the bottom insulating layer 112c protrude upwardly to collectively form an annular portion of the ring body 112. The middle portions MP1, MP2, MP3 are concentrically disposed with each other and share the same center C of circle.

The two side portions SP1 of the top insulating layer 112a extends toward two opposite sides of the ring body 112, respectively. The two side portions SP1 of the top insulating layer 112a make contact with the two side portions SP2 of the insulating layer 112b, respectively. The two side portions SP2 of the intermediate insulating layer 112b extends toward two opposite sides of the ring body 112, respectively. The two side portions SP2 of the intermediate insulating layer 112b make contact with the two side portions SP3 of the bottom insulating layer 112c, respectively.

The exemplary materials of the insulating layers 112a, 112b, 112c may include insulating materials, such as polyvinyl chloride (PVC), and the present invention is not limited thereto. In some embodiments, the insulating layers 112a, 112b, 112c are fabricated using a stereolithography (SLA) 3D printer, and the present invention is not limited thereto.

In addition, the bottom insulating layer 112c further includes a pair of hangers H extending downward from the side portions SP3 of the intermediate insulating layer 112c.

The strap S passes through the two hangers H to collectively define a wearable space WS with the ring body 112, such that the wearer can wear the detector DD on his/her finger through the wearable space WS. In some embodiments, the strap S includes a Velcro tape. The wearer can adjust the position/shape of the strap S to optimize the wearable space WS according to his/her requirement. In some embodiments, the ring body 112 is shaped so as to equip on the index finger of the wearer.

The receiving electrode layer 114 (i.e., antenna structure) may be disposed (or sandwiched) in between the top and the intermediate insulating layers 112a, 112b. The receiving electrode layer 114 may be disposed on a top surface of the intermediate insulating layer 112b. The receiving electrode layer 114 includes a plurality of receiving electrode portions RP separated from each other, and each of the receiving electrode portions RP may serve as a channel of the antenna structure. In some embodiments, the number of the receiving electrode portions RP is, for example without limitation, 5. The receiving electrode portions RP are arranged in a matrix and along a curve path on the top surface of the middle portion MP2 of the intermediate insulating layer 112b. The receiving electrode portions RP of the receiving electrode layer 114 are equally spaced along a circumferential direction.

Referring to FIG. 3, in the embodiment, a covering angle θ of each of the receiving electrode portions RP is defined as an angle included by two extending lines extending from two opposite edges thereof to the center C of circle, respectively. A total covering angle θ of the receiving electrode layer 114, which means a maximum sensing angle range of the detector DD, is defined an angle included by two extending lines extending from two endmost opposite edges of the receiving electrode layer 114 to the center C of circle, respectively. In some embodiments, the covering angle θ is 20 degrees(°), and the total covering angle Θ is 120 degrees (°).

The transmitting electrode layer 116 may be disposed (or sandwiched) in between the intermediate and the bottom insulating layers 112b, 112c. The length of the transmitting electrode layer 116 in the circumferential direction may be longer than that of the receiving electrode layer 114.

The ground electrode layer 118 may be embedded in the bottom insulating layer 112c. In detail, the bottom insulating layer 112c includes two separated portions, and the ground electrode layer 118 is disposed (or sandwiched) therebetween. The ground electrode layer 118 is electrically coupled to an electrical ground. The receiving electrode layer 114, the transmitting electrode layer 116, and the ground electrode layer 118 are concentrically disposed with each other and share the same center C of circle.

The exemplary materials of the receiving electrode layer 114, the transmitting electrode layer 116, and the ground electrode layer 118 may be conductive and elastic materials, for example, thin-film conductive fabric or metal. In some embodiments, the aforesaid electrode layers 114, 116, 118 are produced by a laser cutter.

The circuit board CB may be a print circuit board (PCB), a flexible circuit board, or a rigid circuit board. In some embodiments, the circuit board CB is a PCB board based on Microchip MGC3130, for example, and the present invention is not limited thereto. The circuit board CB includes a processor P, a memory M coupled to the processor P, and a signal generator SG.

In some embodiments, the processor P is a hardware with computing capability, and is used to manage the overall operation of the device. In the embodiment, the processor is, for example, a central processing unit (CPU) with one core or multiple cores, a microprocessor, or other programmable processing unit, Digital Signal Processor (DSP), Programmable Processor, Application Specific Integrated Circuits (ASIC), Programmable Logic Device (PLD) or other similar devices.

In some embodiments, the memory M is stored with a trained classification machine learning (ML) model CM, a trained first ML model ML1, and a trained second ML model ML2. The detailed training process is fully described in the following paragraphs.

In some embodiments, the signal generator SG is an oscillator to provide a square wave AC electrical signal.

Referring to FIG. 2 again, each of the conductive electrode portions CP1 wraps the side portion SP1 of the top insulating layer 112a. Specifically, each of the conductive electrode portions CP1 extends from a top surface of the side portion SP1 to a bottom surface of the side portion SP1 through a side surface of the side portion SP1. Each of the enameled wires EW extends from the corresponding conductive electrode portion CP1 to a position on the corresponding receiving electrode portion RP, such that the corresponding conductive electrode portion CP1 may be coupled to the corresponding receiving electrode portion RP. Referring to FIGS. 1 and 2, the circuit board CB may be coupled to the receiving electrode layer 114 through the conductive wires CW, the conductive electrode portions CP1, and the enameled wires EW. On the other hand, the circuit board CB may be coupled to the transmitting electrode layer 116 through the conductive electrode portion CP2. Thus, the elements of the circuit board CB may be coupled to the receiving electrode layer 114 and the transmitting electrode layer 116 through the aforesaid configuration.

Furthermore, in order to ensure a proper contact in between the enameled wire EW and the corresponding conductive electrode portion CP1, the magnetic elements MM1, MM2 may be used to solve the aforesaid issue. The magnetic elements MM1 may be disposed on a bottom surface of the top insulating layer 112a. The magnetic elements MM1 may be disposed on the receiving electrode portions RP, respectively. The magnetic elements MM1 may be disposed on ends of the enameled wires EW, respectively. Each of the magnetic elements MM1 may be disposed on an overlap area between the corresponding receiving electrode portion RP and the corresponding enameled wire EW. On the other hand, the magnetic elements MM2 may be disposed on the top surface of the intermediate insulating layer 112b. The magnetic elements MM2 may be disposed under the receiving electrode portions, respectively. The magnetic elements MM2 may be disposed under the ends of the enameled wires EW. By such a configuration, the relative position between the receiving electrode portion RP and the enameled wire EW is more stable, thereby achieving a better connection through the magnetic force generated by the magnetic elements MM1, MM2. In some embodiments, the magnetic elements MM1, MM2 are, for example without limitation, magnets.

Brief Sensing Principle of the interactive wearable device 100

The sensing principle of the present invention is described as follows.

Figure 4:
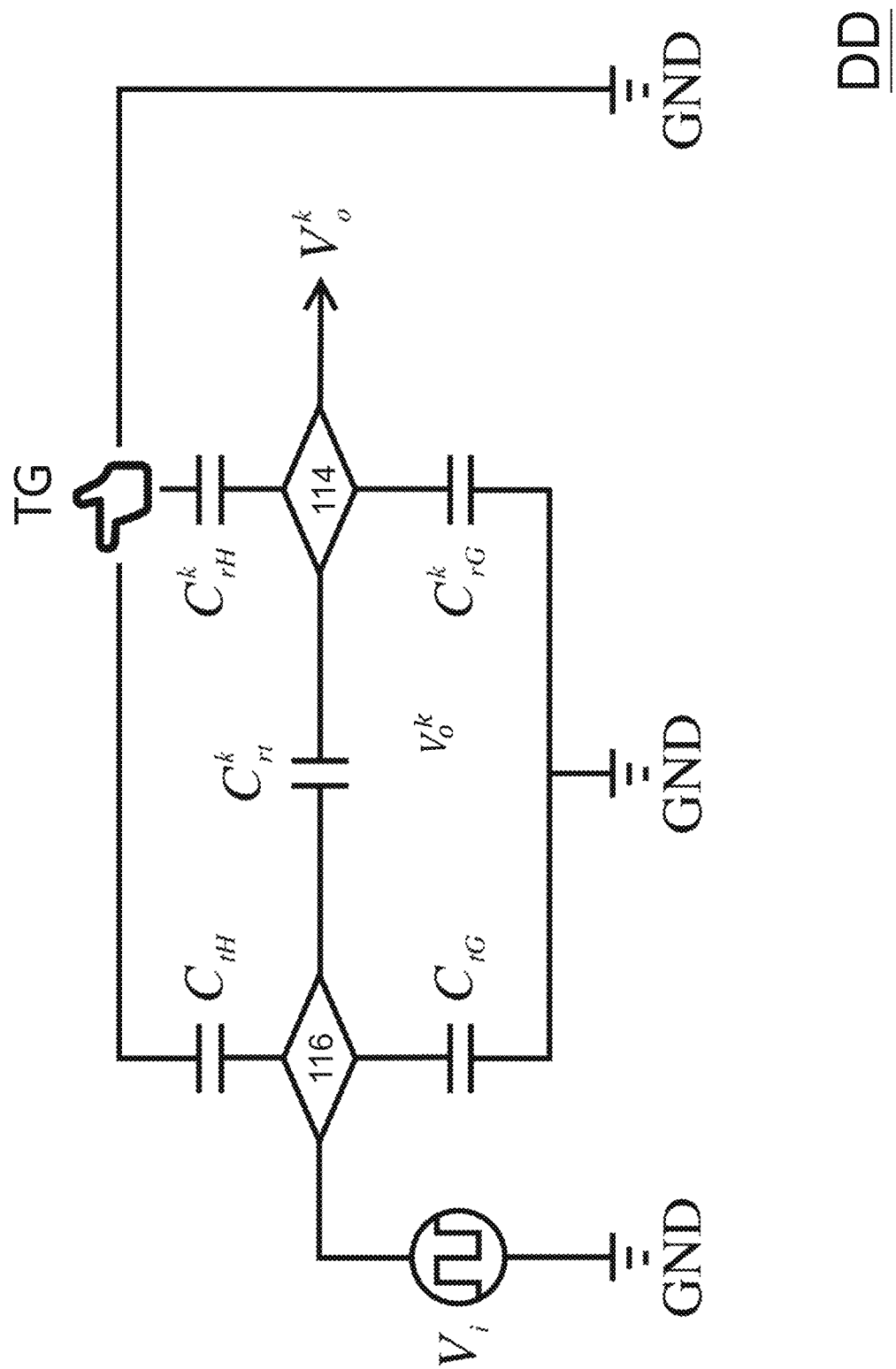
FIG. 4 depicts a circuit model of the detection device in the FIG. 1A.

In the present invention, the interactive wearable device 100 adopts electric field sensing technology for analyzing a movement event caused by two different fingers of an wearer TG. FIG. 4 depicts a circuit model of the detection device DD. Referring to FIG. 4, in the embodiment, the signal generator SG of the circuit board CB provides at least one input electrical signal $V_i$ (e.g., input voltage signal) to the transmitting electrode layer 116. In some embodiments, the input electrical signal $V_i$ is a low-voltage alternating voltage signal, and its switching frequency is, for example without limitation, 115 kHz.

Before analysis process of the present invention, the wearer TG can wear on the detector DD by putting his/her finger into the wearable space WS of the detector DD, such that the receiving electrode portions RP is fitted around wearer's TG finger along a curve path during a movement event caused by the wearer's fingers. In some embodiments, the detector DD detects the thumb-to-index finger movement by generating an electric field around the ring-worn position around the index finger. The receiving electrode layer 114 receives a transmitted alternating current (AC) signal through a capacitive path between the transmitting electrode layer 116 and the receiving electrode layer 114 in response to the input electrical signal $V_i$. When the wearer's TG hand or finger intrudes an electrical field generated by the AC signal, the low-frequency energy is capacitively coupled into the human body. Since the human body is much larger than the size of the electrode, the portion of the human body that is out of the electrical field serves as another charge reservoir. In other words, the coupling of the human body causes the change of the capacitance of the detector DD. Such changes can be processed to track the body movements and classify the movement patterns. When the relative movements between the thumb finger and the index finger occur, the capacitance changes, and the output electrical signal $V_o^k$ (i.e., output voltage signal) from the receiving electrode portions RP of the receiving electrode layer 114 also changes correspondingly.

Based on the aforementioned sensing principle, it is implemented a multiple-receiver electric-field sensing system for the ring-formed detector DD of the interactive wearable device 100 to enrich the sensing resolution for detecting the subtle finger movement. Furthermore, since the receiving portions RP of the receiving electrode layer 114 are arranged along a curved path, which can conform/fit to the shape of the wearer's TG finger, the signal measured/sensed/detected by the detector DD of the present invention can more accurately respond to a movement event caused by fingers of the wearer TG.

Given the input electrical signal as $V_i$ to the transmitting electrode layer 116, the output electrical signal as $V_o^k$ from the $k^{th}$ receiving electrode portion RP is formulated by the following equation (1).

$$V_o^k = V_i * \frac{C_{rt}^k}{C_{rt}^k + C_{rG}^k + C_{rH}^k} \quad (1)$$

Where $C_{rt}^k$ represents a capacitance between the $k^{th}$ receiving electrode portion RP of the receiving electrode layer 114 and the transmitting electrode layer 116, $C_{rG}^k$ represents a capacitance between the $k^{th}$ receiving electrode portion RP of the receiving electrode layer 114 and the ground electrode layer 116, and $C_{rH}^k$ is a capacitance between the $k^{th}$ receiving electrode portion RP of the receiving electrode layer 114 and wearer's TG finger.

The capacitance C between two electrodes is given by the following equation (2).

$$C = \epsilon_r \epsilon_0 \frac{A}{d} \quad (2)$$

Where A represents the overlapping area between the two electrodes, d is the relative distance between the electrodes, $\epsilon_r$ represents relative permittivity of a dielectric between the two electrodes with respective to vacuum permittivity, and $\epsilon_0$ represents vacuum permittivity.

Combining the equations (1) and (2), it can be inferred that the electric field is affected by parameters A and d mainly, which means that placement of the transmitting electrode layer 116 and the receiving electrode layer 114 affects the sensing range of the detector DD. In the actual hardware implementation, the relative positions between the receiving electrode layer 114, the transmitting electrode layer 116, and the ground electrode layer 118 usually do not change. Thus, given the equations (1) and (2), it can be inferred the following equation (3).

$$V_o^k = V_i \propto \frac{d_{rH}^k}{A_{rH}^k} \quad (3)$$

Where $d_{rH}^k$ represents a distance between the $k^{th}$ receiving electrode portion RP of the receiving electrode layer 114 and wearer's finger, and $A_{rH}^k$ represents an overlapping area between the $k^{th}$ receiving electrode portion RP of the receiving electrode layer 114 and wearer's finger. The equation (3) indicates the output electrical signal $V_o^k$ from the $k^{th}$ receiving electrode portion RP of the receiving electrode layer 114 changes proportionally to the distance between the finger and the $k^{th}$ receiving electrode portion RP of the receiving electrode layer 114, and changes inversely proportional to the overlapping area between them. In short, it is reasonable to hypothesize that the change of the output electrical signal $V_o^k$ reflects the movement pattern of the thumb finger which may indicate the type of the T2I gestures.

Optimizing device wearing angle

Figure 5A:
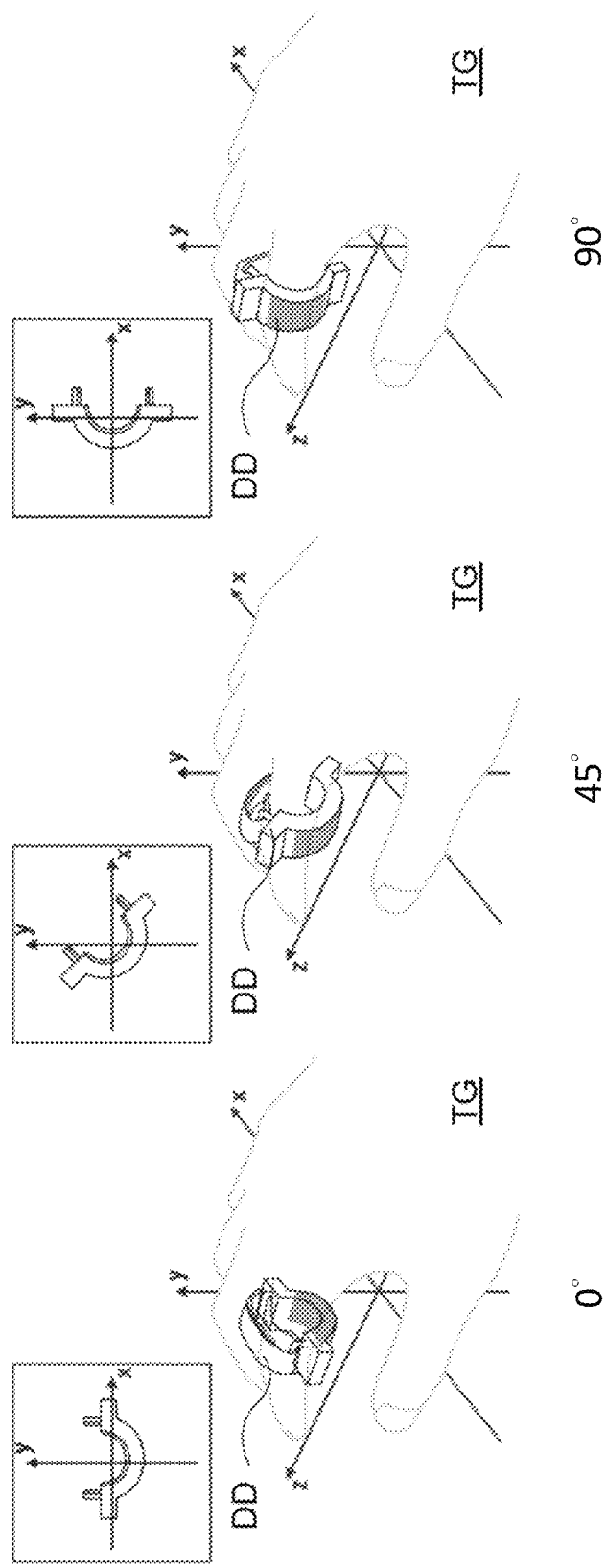
FIG. 5A depicts a scheme diagram about a wearer wearing with the detector in the FIG. 1A under different wearing angles.
Figure 5B:
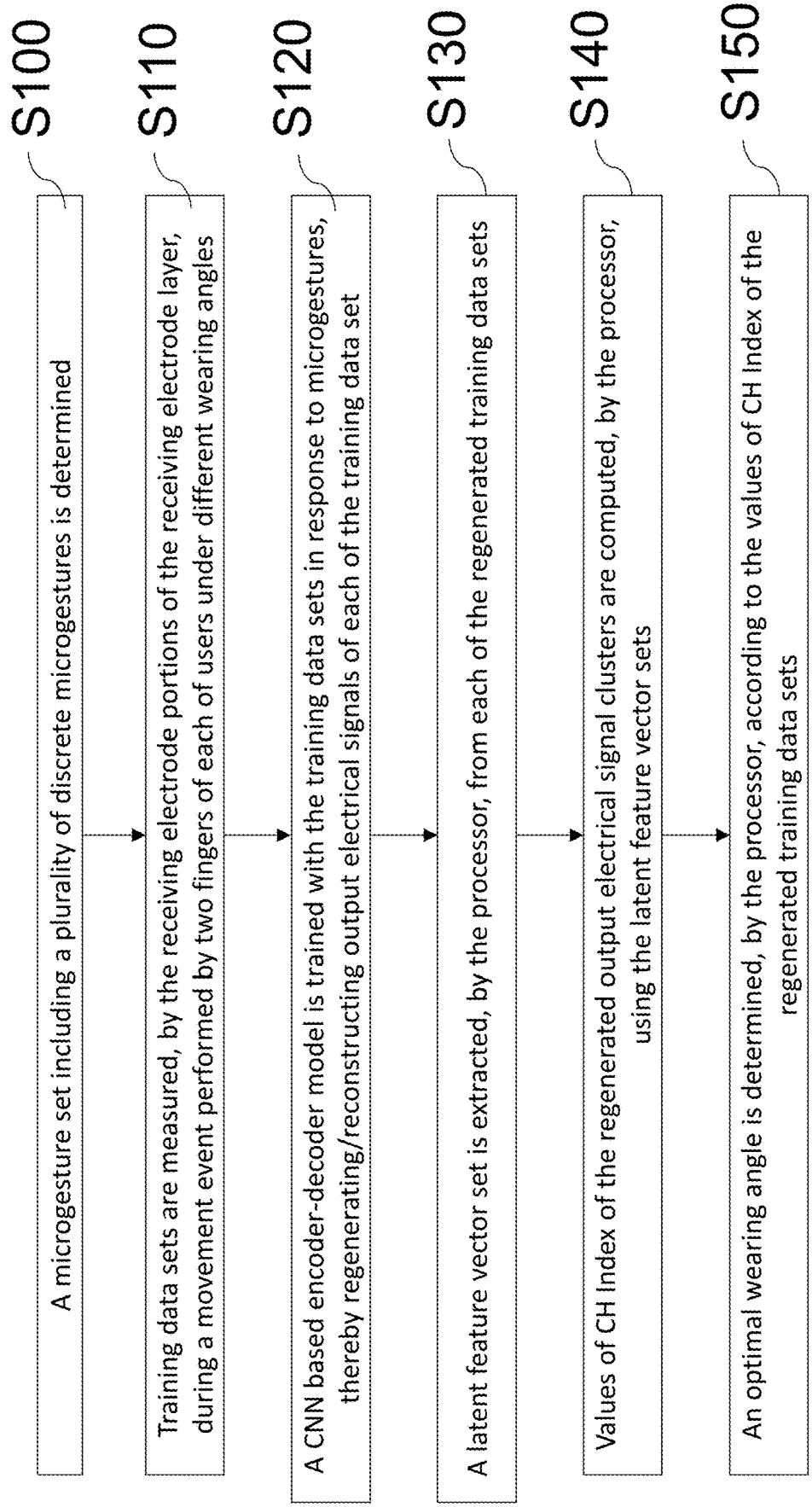
FIG. 5B depicts a step flow chart of determining the optimal wearing angle according to an embodiment of the present invention.
Figure 6:
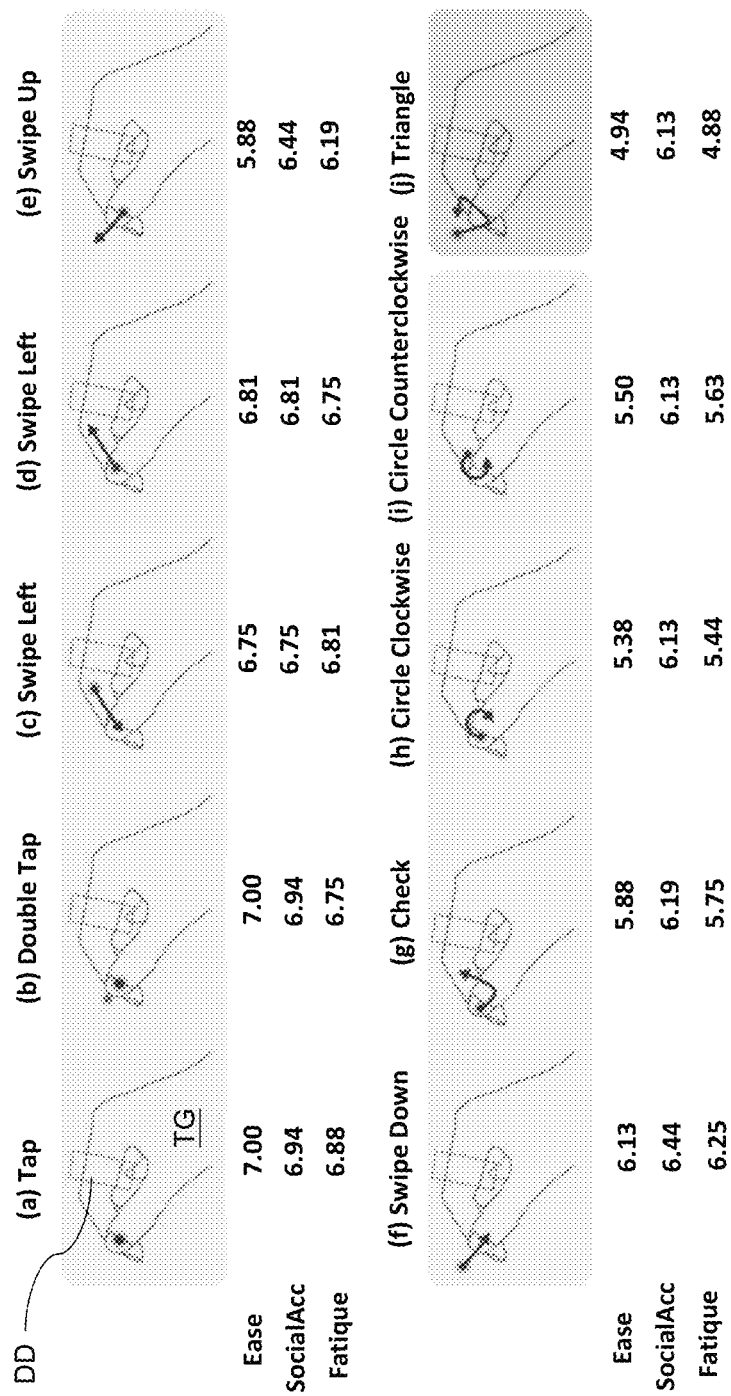
FIG. 6 depicts different microgestures and preferences of different wearers for these microgestures.
Figure 7:
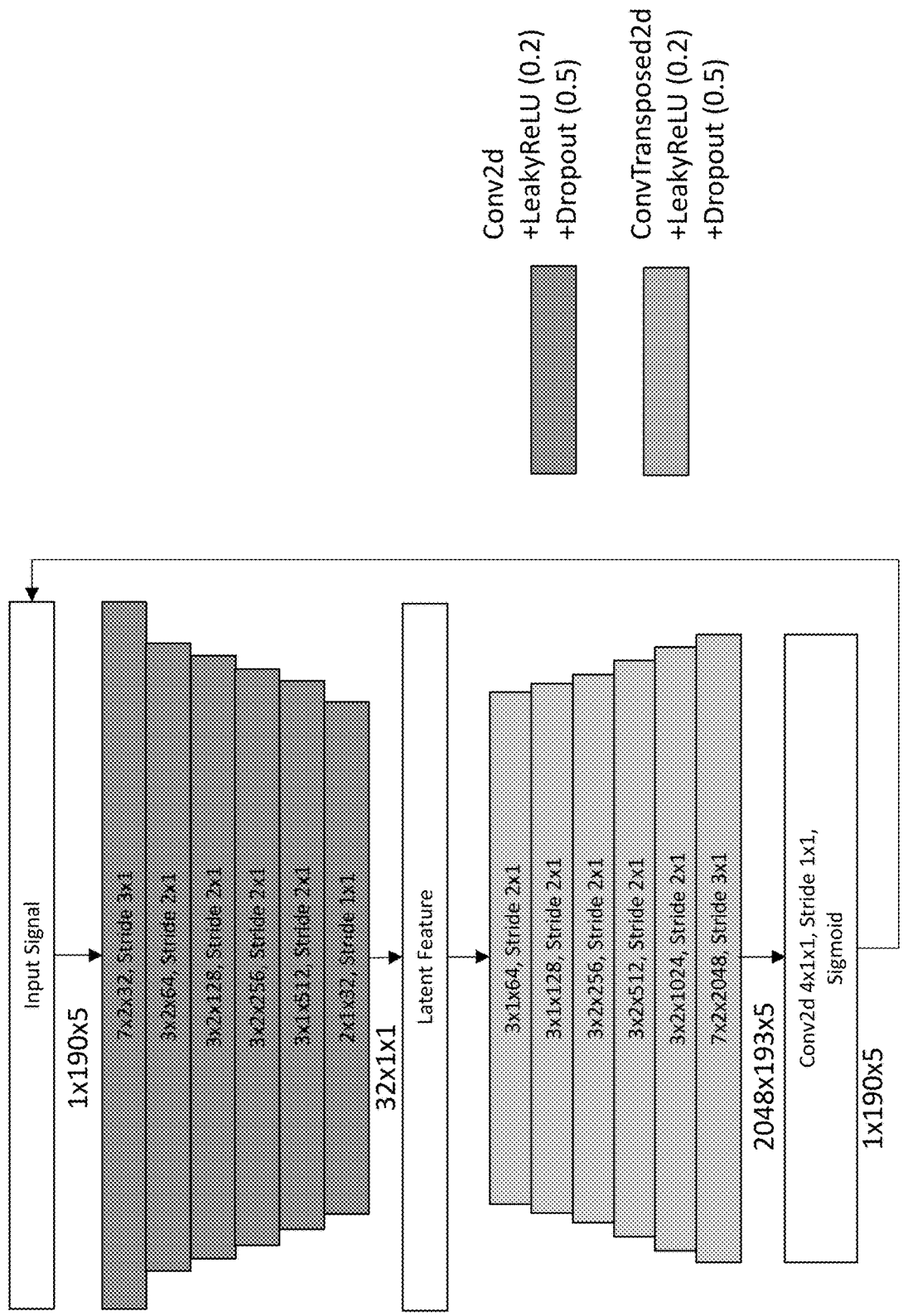
FIG. 7 depicts an auto-encoder-decoder model according an embodiment of the present invention.

In addition, the present invention provides a method to optimize the device wearing angle. FIG. 5A depicts a scheme diagram about a wearer TG wearing on the detector DD under different wearing angles. Assuming the wearer TG and the detector DD are located in a space defined by X axis, Y axis, and Z axis perpendicular to each other. The left part, middle part, and the right part in the FIG. 5A depict the schematic diagrams of the wearer TG wearing on the detector DD in the FIG. 1A under 0 degree, 45 degrees, and 90 degrees, respectively. A wearing angle is defined as an included angle between a facing direction of the receiving electrode layer (e.g., as marked as the dark grey shade area) and a YZ plane defined by the Y axis and Z axis. FIG. 5B depicts a step flow chart of determining the optimal wearing angle according to an embodiment of the present invention. FIG. 6 depicts different microgestures (a)~(j) and corresponding wearer's rating. FIG. 7 depicts an auto-encoder-decoder model according an embodiment of the present invention. The detailed steps S100~S150 for optimizing device wearing angle/orientation are fully described in combination with FIGS. 5A, 5B, 6 and 7 as follows.

Referring to FIGS. 5B and 6. In the step S100: A microgesture set including a plurality of discrete microgestures (a)~(j) different from each other is determined, as shown in the FIG. 6. A discrete microgesture is defined as a gesture performed by two different fingers that is completed with a sequence of motions (e.g., drawing a circle) and is mapped to a specific command/event. In some embodiments, the microgestures (a)~(j) include, for example, 10 T2I microgestures, such as (a) Tap microgesture, (b) Double Tap microgesture, (c) Swipe Up microgesture, (d) Swipe Down microgesture, (e) Swipe Left microgesture, (f) Swipe Right microgesture, (g) Triangle microgesture, (h) Check microgesture, (i) Counterclockwise Circle microgesture, and (j) Clockwise Circle microgesture.

In the step S110: Wearing-angle training data sets are measured, by the receiving electrode portions RP of the receiving electrode layer 114, during a period of performing each of microgestures by two fingers of each of wearers under different wearing angles. In some embodiments, the wearing angle is, for example without limitation, 0 degree, 45 degrees, or 90 degrees.

In the step S120: A Convolutional Neural Network (CNN) based encoder-decoder ML model is trained with the wearing-angle training data sets in response to microgestures, thereby regenerating/reconstructing output electrical signals of each of the wearing-angle training data set. Referring to FIG. 7, in some embodiments, the CNN based encoder-decoder model includes six 2D convolutional layers for the encoder and six 2D transposed convolutional layers for the decoder.

In the step S130: A latent feature vector set is extracted, by the processor P, from each of the regenerated wearing-angle training data sets, in which the latent feature vector set is used as a low-dimensional representation for Calinski-Harabasz (CH) Index computation in the following step.

In the step S140: Values of CH Index of the regenerated wearing-angle training data sets are computed, by the processor P, using the latent feature vector sets. In one aspect, the output electrical signals of each microgesture are regarded as one cluster. Specifically, for a specific wearing angle, a better gesture distinguishability leads to a larger between-clusters dispersion in the latent space, while a good feature stability across different wearers precipitates a small inter-cluster dispersion in a latent space. It should be noted that a CH Index indicates a between-clusters dispersion and inter-cluster dispersion of the output electrical signal clusters. The CH Index CH is given as the following equation (4).

$$CH = \frac{SS_{BG}}{K-1} / \frac{SS_{WG}}{N-K} \quad (4)$$

Where $SS_{BG}$ represents a between-clusters sum of square, $SS_{WG}$ represents an inter-cluster sum of square, K is the total number of clusters, and N is the total number of samples. With the ground truth cluster label for each gesture sample in the latent space feature point, $SS_{BG}$ and $SS_{WG}$ can be calculated as the following equations (5), (6):

$$SS_{BG} = \sum_{k=1}^{K} n_k \|C_k - c\|^2 \quad (5)$$

$$SS_{WG} = \sum_{k=1}^{K} \sum_{x \in C_k} \|x - C_k\|^2 \quad (6)$$

where k represents the $k^{th}$ cluster, $C_k$ is the set of points in k, $c_k$ is the cluster center of k, and $n_k$ is the number of points in k. c is the center of all sample in the space.

In the step S150: An optimal wearing angle is determined according to the values of CH Index of the regenerated wearing-angle training data sets. The results shows that CH value (55.04) of wearing angle at 90 degrees outperforms that (36.13) of wearing angle at 0 degree and that (24.12) of wearing angle at 45 degrees. Thus, the optimal wearing angle is, for example, 90 degrees.

In the embodiments of the present invention, the interactive wearable device 100 is configured to recognize and analyze a movement event caused by an index finger and a thumb finger of the wearer. Specifically, the interactive wearable device 100 recognizes one or more known microgestures and provides a regression result of estimating a position of the thumb finger on the index finger of 1D continuous movement performed by two thumb and index fingers. In order to achieve the above objective, three ML models ML1, CM, ML2, are trained. Each of the training methods of the ML models ML1, CM, ML2 is fully described as follows.

First of all, a ML model ML1 is trained with training data sets in response to one or more known microgestures. The process steps of the method to train the ML model ML1 are fully described as follows.

Figure 8:
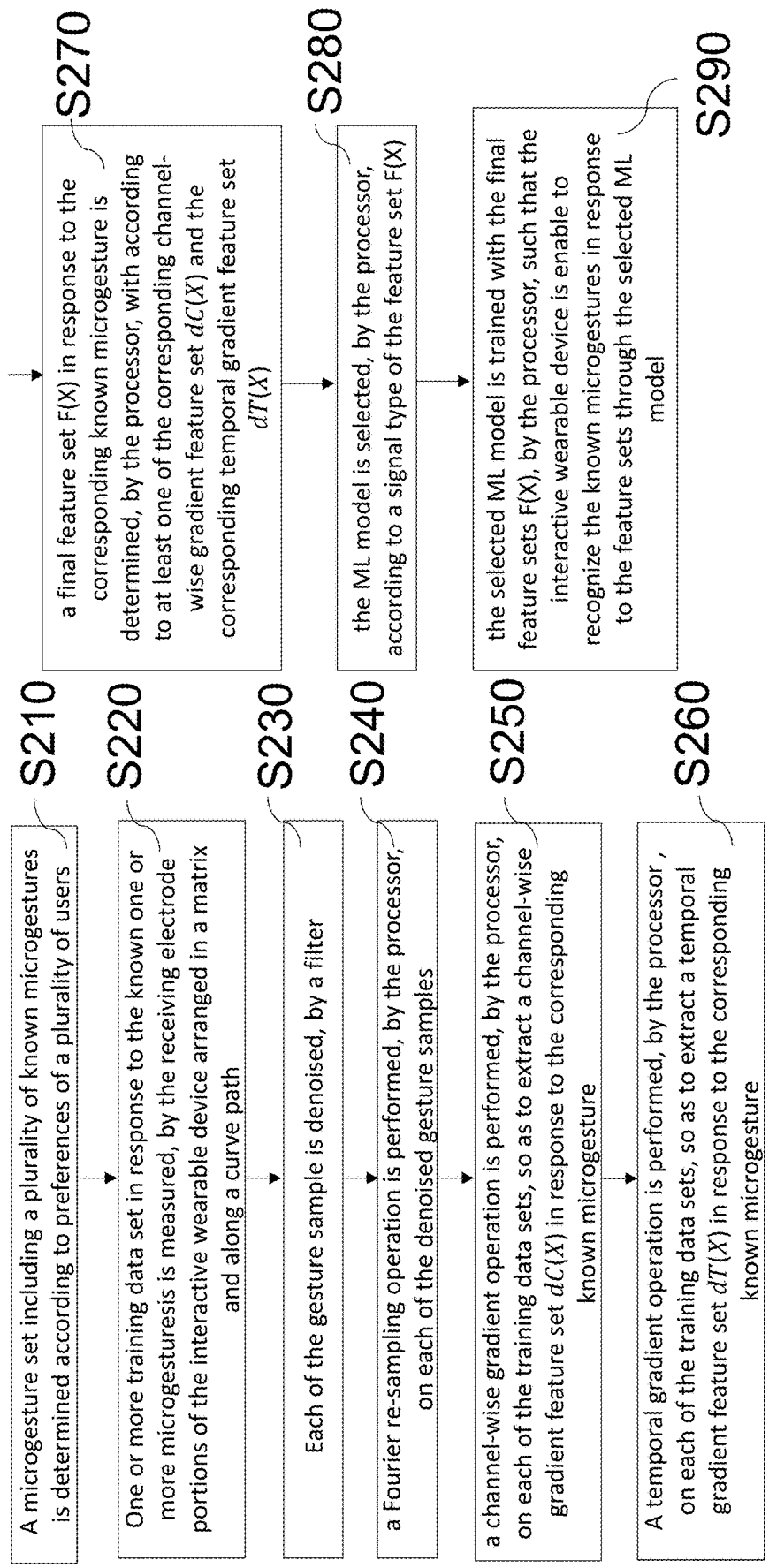
FIG. 8 depicts a step flow chart of a training method for training the first ML model according to an embodiment of the present invention.
Figure 9:
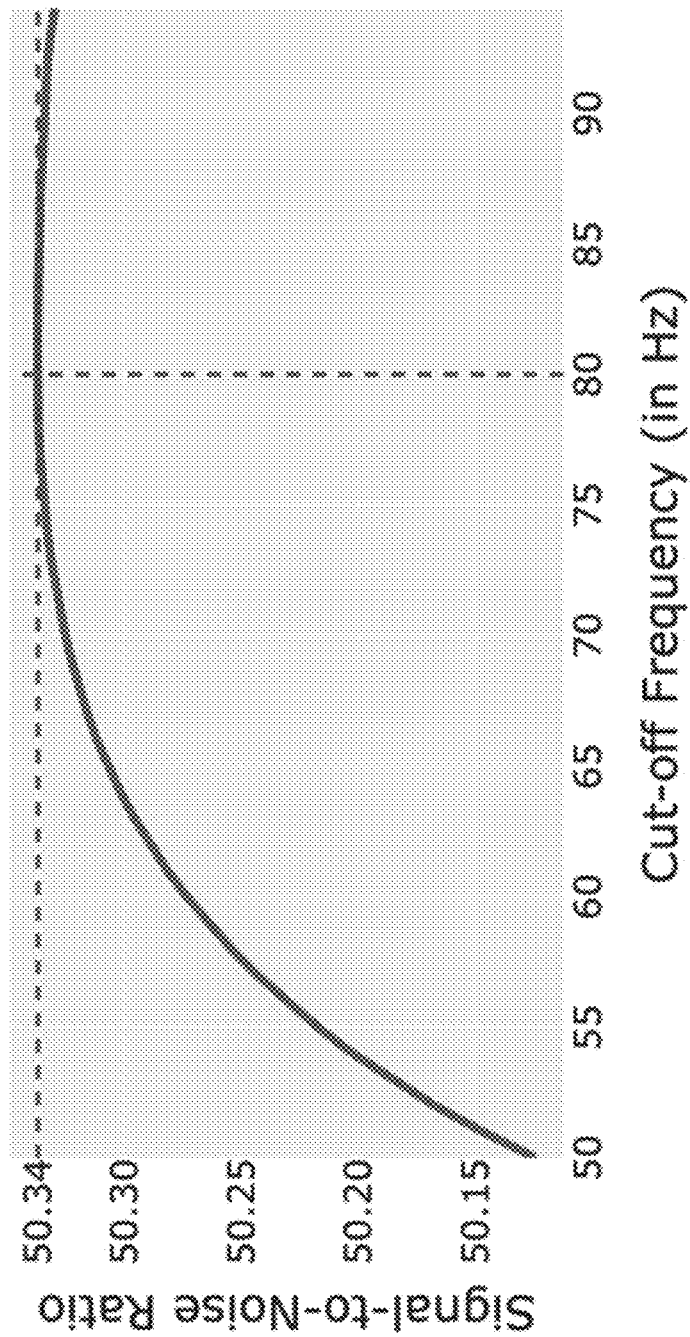
FIG. 9 depicts an average signal-to-noise ratio (SNR) on data set after applying the low-pass filter with different cut-off frequencies ranging from 50 Hz to 94 Hz.

FIG. 8 depicts a step flow chart of a training method for training the first ML model according to an embodiment of the present invention. FIG. 9 depicts an average signal-to-noise ratio (SNR) on data set after applying the low-pass filter with different cut-off frequencies ranging from 50 Hz to 94 Hz.

Referring to FIG. 8, in the step S210: A microgesture set including a plurality of known (or selected) microgestures is determined according to the preferences of a plurality of wearers. Referring again to FIG. 6, each of the wearers is asked to wear on the detector DD through their index finger, and then is asked to perform the known microgestures (a) to (j). After that, each of the wearers is asked to rate each of the known microgestures (a) to (j) according to three criteria along a 7-point Likert-scale (1: strongly disagree to 7: strongly agree).

The criteria 1, "Ease to perform" is abbreviated as "Ease" in the FIG. 6, means that it is easy to perform this gesture precisely for the wearer.

The criteria 2, "Social acceptance" is abbreviated as "SocialAcc" in the FIG. 6, means that the microgesture can be performed without social concern.

The criteria 3, "Fatigue" in the FIG. 6, means that the microgesture makes the wearer tired.

Thus, based on the result of preferences of the wearers shown in the FIG. 6, a microgesture set including microgestures (a)~(i) (e.g., as marked as a light gray shade region in the FIG. 6) is determined (or selected), and the microgesture (j) (e.g., as marked as a dark gray shade region in the FIG. 6) is not to be selected due to low wearer preferences.

In the step S220: One or more training data set in response to the known one or more microgestures (a)~(i) is measured, by the receiving electrode portions RP of the interactive wearable device 100 arranged in a matrix and along a curve path. In detail, each of the wearers is asked to wear on the detector DD on his/her index finger, and performs each of the microgestures (a)~(i) several times.

For example, in this particular experiment conducted, the data set measurement process included two parts. With respect to the first part, each of the wearers was asked to repeat each of the known microgestures (a)~(i) 40 times until he/she finished all known gestures in random order. In another experiment conducted, each of the wearers was asked to take off the detector DD and put it on again after every 10 times of recording so to increase the data variance. The data sets measured from the first part served as microgesture training data sets. With respect to the second part, each of the wearers was asked to repeat each known microgesture 10 times, and the known microgestures were shuffled randomly. The data sets measured from the second part served as testing data sets.

Each of microgesture training data sets includes a plurality of gesture samples X (e.g., the number of the gesture samples X is 40), each of the gesture samples X includes N measurement frames $x_t$, and each of the measurement frames includes a plurality of electrical output signals measured by the receiving electrode portions RP at a timestamp t, respectively.

Where each of the gesture samples X is represented as $X=\{x_t\} t \in \{0, \ldots, N-1\} \in R(5 \times N)$; and the measurement frames $x_t$ is represented as $x_t=[V_t^1, V_t^2, \ldots, V_t^n \ldots V_t^m]^T$. $V_t^n$ represents an output electrical signal measured by $n^{th}$ channel (i.e., $n^{th}$ receiving electrode portion RP) of the receiving electrode layer 114, and m represents the numbers of the receiving electrode portion RP (e.g., m=5). In some embodiments, N is a positive integer and is set to be 190.

In the step S230: each of the gesture sample X is denoised, by a filter (not shown in the figures), such that a nail portion and a tail portion of the N measurement frames of the corresponding gesture sample X are removed. In some embodiments, the number of the removed frames is, for example without limitation, 19 measurement frames. Thus, the noisy measurement occurred while activating and terminating the recording program can be avoided.

In the step S240: a Fourier re-sampling operation is performed, by the processor P, on each of the denoised gesture samples X, such that the sample length on every channel to be N. N is, for example, 190. Then, a low-pass filter with cut-off frequency of 80 Hz is applied to filter each of the gesture samples X again after the Fourier re-sampling operation, such that the potential high-frequency random noise signal generated by the circuit is filtered. The value of 80 Hz for the cut-off frequency of the low-pass filter is determined as it achieved the highest signal-to-noise ratio (SNR) as shown in the FIG. 9.

In the step S250: a channel-wise gradient operation is performed, by the processor P, on each of the microgesture training data sets, so as to extract a channel-wise gradient feature set dC(X) in response to the corresponding known microgesture. In detail, the channel-wise gradient operation is performed on any two of the electrical output signals of each of the measurement frames of the each of the gesture samples X, so as to extract the channel-wise gradient feature set in response to the corresponding known microgesture.

Where the channel-wise gradient feature set dC(X) is represented as: $dC(X)=\Delta V_{(i,j)}^t \to |t \in \{0, \ldots, N-1\}, (i, j) \in P_c\} \in R^{(10*N)}$; and (i, j) represents the channel pairs in the gesture sample X. $\Delta V_{(i,j)}^t$ is given by the following equation (7).

$$\Delta V_{(i,j)}^t = \frac{V_i^t - V_j^t}{|i - j|} \quad (7)$$

Where $V_i^t$ represents the output electrical signal measured by $i^{th}$ channel (i.e., $i^{th}$ receiving electrode portion RP); and $V_j^t$ represents the output electrical signal measured by $j^{th}$ channel (i.e., $j^{th}$ receiving electrode portion RP). That is to say, the $\Delta V_{(i,j)}^t$ in the channel-wise gradient feature set represents a spatial correlation between each pair of the $i^{th}$ and $j^{th}$ receiving electrode portions RP.

In the step S260: a temporal gradient operation is performed, by the processor P, on each of the microgesture training data sets, so as to extract a temporal gradient feature set dT(X) in response to the corresponding known microgesture. In detail, for each of the microgesture training data sets, the temporal gradient operation is performed, by the processor P, on each of the electrical output signals in each of the measurement frames of each of the gesture samples X, so as to extract the temporal gradient feature set dT(X) in response to the corresponding known microgesture, in which $dT(X) \in R^{(5 \times N)}$.

In the step S270: a final feature set F(X) in response to the corresponding known microgesture is determined, by the processor P, with according to at least one of the corresponding channel-wise gradient feature set dC(X) and the corresponding temporal gradient feature set dT(X). In some embodiments, only the channel-wise gradient feature set dC(X) serves as the final feature set F(X). In some embodiments, only the temporal gradient feature set dT(X) serves as the final feature set F(X). In some embodiments, a combination of the channel-wise gradient feature set dC(X) and the temporal gradient feature set dT(X), in which $F(X)=dC(X) \cup dT(X), \in R^{(15 \times N)}$, serves as the final feature set F(X).

In the step S280: the ML model ML1 is selected, by the processor P, according to a signal type of the feature set F(X).

For example, in some embodiments, if the signal type of the final feature set F(X) is time-domain, the ML model ML1 is selected, by the processor P, from a support vector machine (SVM) model, a multilayer perceptron (MLP) model, or a convolutional neural network (CNN) model.

In some embodiments, a Short-time Fourier transform (STFT) operation is performed on each feature channel of the final feature set F(X), such that signal type of the feature set F(X) is transformed into frequency-domain. Under such a condition, the ML model ML1 is selected, by the processor P, from a visual geometry group (VGG) model, a visual geometry group (VGG) model, a residual networks (ResNet) model, a densely connected convolutional network (DenseNet) model, or a vision transformer (ViT) model.

In the step S290: the selected ML model ML1 is trained with the final feature sets F(X), by the processor P, such that the interactive wearable device 100 is enable to recognize the known microgestures (a)~(i) in response to the feature sets F(X) through the selected ML model ML1.

In some embodiments, in the step S280, a data-augmentation scheme is performed by rolling each of the gesture samples X by a random offset, in which the data-augmentation probability is set to be, for example, 0.5 for every gesture sample X. Also, in some embodiments, a label-smoothing technique with the smoothing parameter (e.g., $\epsilon=0.1$) is performed during the training process. Thus, the generalizability of the ML model MLI is improved, and the over-fitting issue is avoided.

Figure 10:
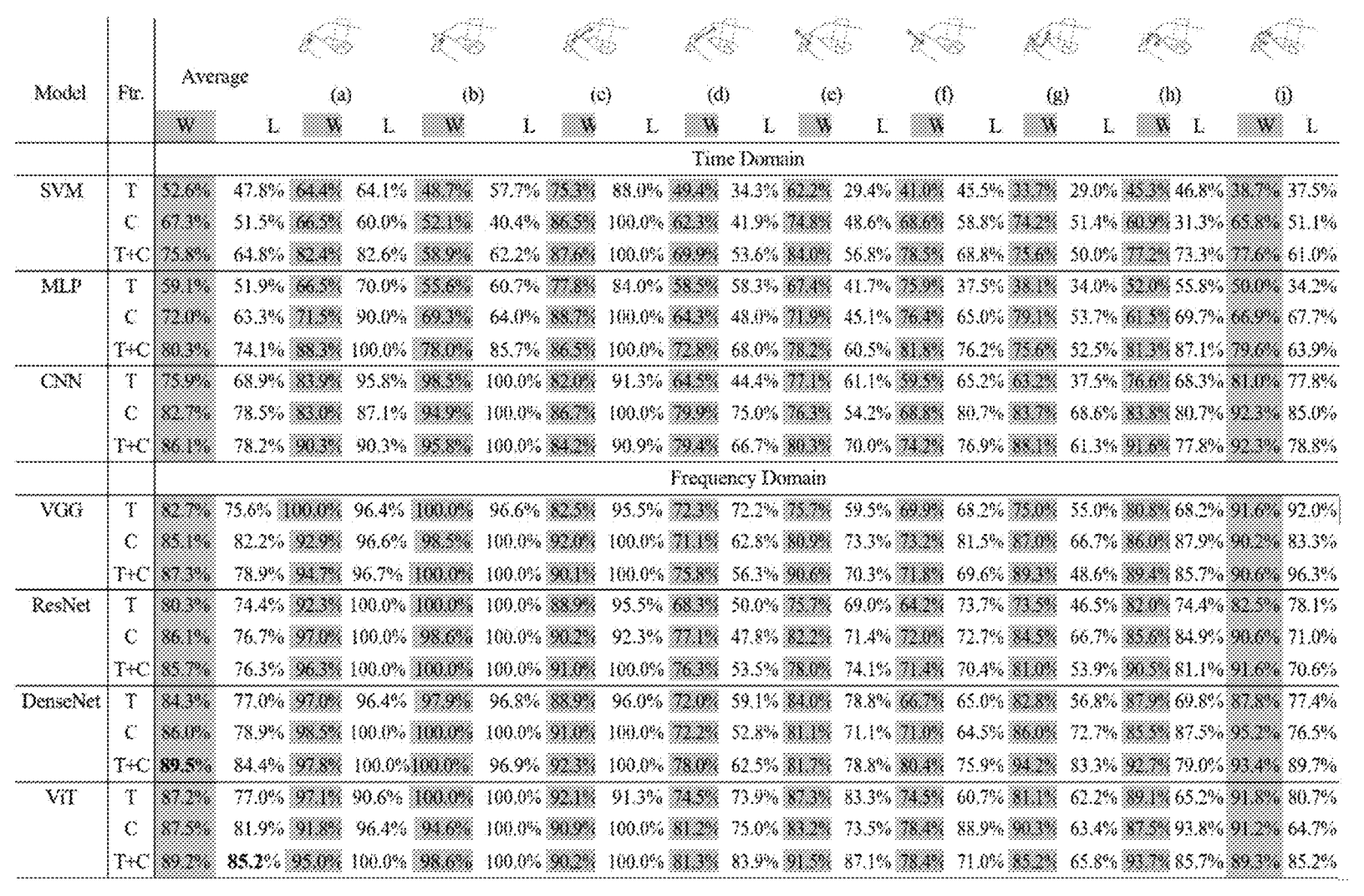

FIG. 10 shows a testing accuracy of each of the known microgestures with different models and under different evaluation. Referring to FIG. 10, "W" represents within-wearer evaluation, "L" represents a leave-3-wearer-out evaluation, "T" represents a temporal gradient feature set, "C" represents a channel-wise gradient feature set, and "T+C" represents a mix gradient. The upper part in the FIG. 10 shows the models trained with feature sets in the time domain, and the lower part in the FIG. 10 focuses on the evaluation in the frequency domain.

In some embodiments, during the evaluation of the generalizability of the gesture classification using the trained ML model ML1, two data-splitting schemes 1, 2 are applied. 14 wearers are asked to participate the evaluation. Data sets measured from all 14 wearers are used as within-wearer evaluation, with the split of 3:1:1 for the training, the validation, and the testing data respectively. Then, the selected ML model is trained with the microgesture data sets measured from 11 wearers. The selected ML model is tested on 3 left-out wearers as a leave-three-wearer-out evaluation. The 3 left-out wearers are selected based on their signal quality. Specifically, it is calculated the average SNR for data set of each of wearers, and 3 wearers are picked whose SNRs are three lowest as three leave-three-out testing dataset. During the leave-three-out evaluation, it is used a random 30% subset of the microgesture training data sets as the validation data sets.

According to a result in the FIG. 10, overall, transferring the time-series signal to the frequency domain can achieve a higher performance compared to directly using the signals in the time domain. This is because the 2D data representation of the signal in the frequency domain allows the usage of deep neural networks for hidden feature extraction. The results also show that in general, using the T+C data leads to a better performance than using T or C only. This suggests the importance of both the channel-wise gradient feature set and the temporal gradient feature sets for known microgesture classification on the interactive wearable device 100.

Secondly, a classification ML model CM is trained with at least one negative training data sets in response to the negative event, and is trained with at least one of positive training data sets in response to the positive event. The steps of training method to train the ML model ML2 are fully described as follows.

Figure 11:
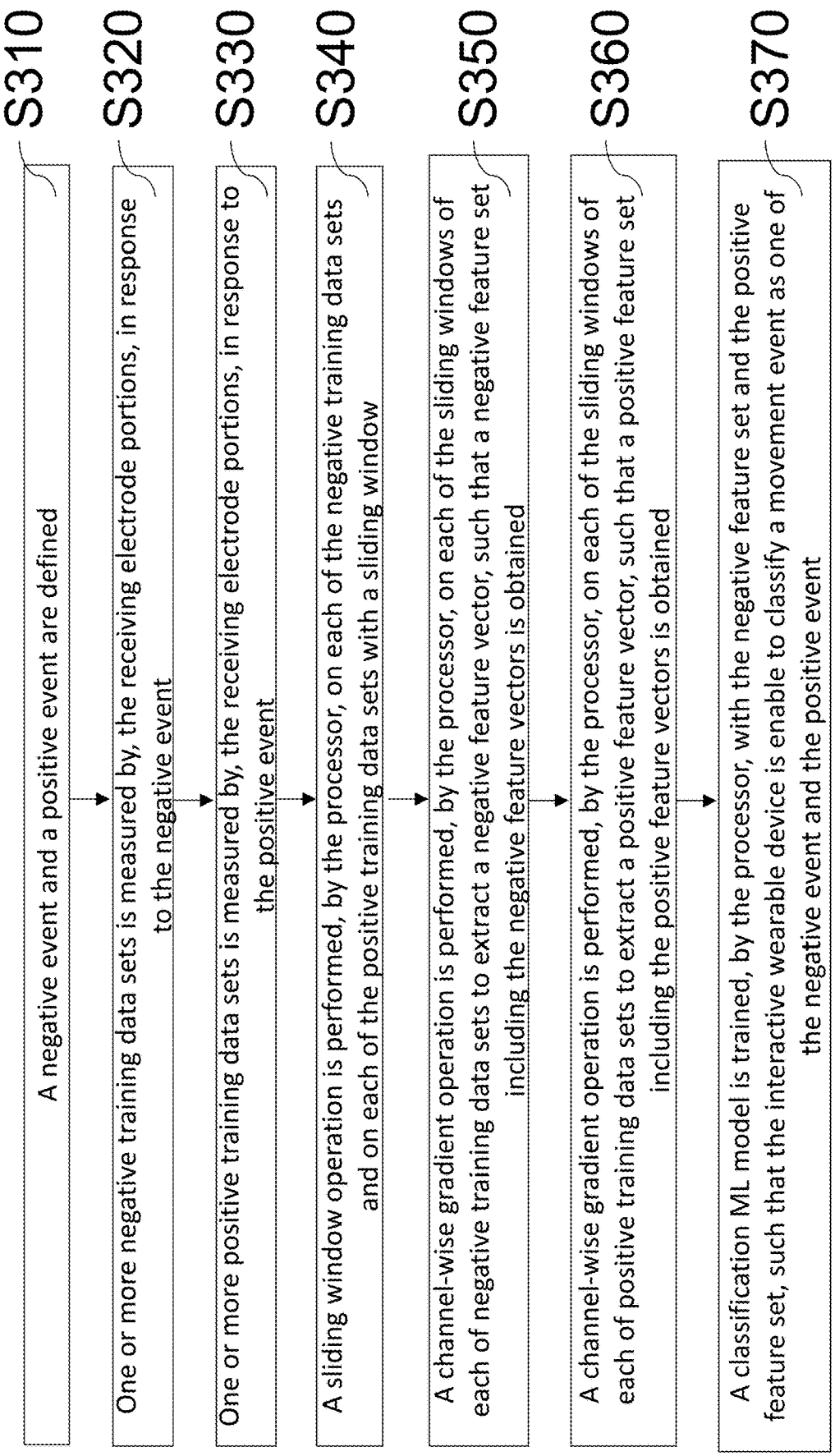
FIG. 11 depicts a step flow chart of a training method for training the classification ML model according to an embodiment of the present invention.

FIG. 11 depicts a step flow chart of a training method for training the classification ML model CM according to an embodiment of the present invention.

Referring to FIG. 11, in the step S310: A negative event and a positive event are defined. In detail, the negative event may include, for example, two different situations, such as a separate event of the thumb finger and the index finger and a staying-still event of the thumb finger and the index finger. The separate event of the thumb finger and the index finger represents that the thumb finger is not in contact with the index finger. The staying-still event of the thumb finger and the index finger represents that thumb finger is in contact with the index finger but staying still. On the other hand, the positive event may include, for example, one or more known microgestures (a) to (j) as shown in the FIG. 6.

In the step S320: One or more negative training data sets is measured by, the receiving electrode portions RP, in response to the negative event during a negative event caused by the two fingers.

In the step S330: One or more positive training data sets is measured by, the receiving electrode portions RP, in response to the positive event during a positive event caused by the two fingers.

In the step S340: A sliding window operation is performed, by the processor P, on each of the negative training data sets and on each of the positive training data sets with a sliding window, in which the sliding window is moved across each of the negative training data sets and each of the positive training data sets. In detail, during the sliding window operation, the processor P applies a sliding window frame F with the step size of 5 ms (1 frame) across the training data set (16 ms, 3-frames).

In the step S350: A channel-wise gradient operation is performed, by the processor P, on each of the sliding windows of each of negative training data sets to extract a negative feature vector, such that a negative feature set including the negative feature vectors is obtained.

In the step S360: A channel-wise gradient operation is performed, by the processor P, on each of the sliding windows of each of positive training data sets to extract a positive feature vector, such that a positive feature set including the positive feature vectors is obtained. In some embodiments, while each positive feature set includes a vector with the dimension of $R^{(10 \times 1)}$.

In the step S370: A classification ML model CM is trained, by the processor P, with the negative feature set and the positive feature set, such that the interactive wearable device 100 is enable to classify a movement event as one of the negative event and the positive event. In some embodiments, the classification ML model CM is a binary SVM classifier. In addition, in some embodiments, in the step S20, a grid-searching mechanism is performed, by the processor P, to find the optimal set of hyper-parameters (RBF kernal, C =1000, g =0.1) for the SVM classifier.

Thirdly, a ML model ML3 is trained with a plurality of 1D-continuous-movement training data sets in response to different wearers, in which each of the 1D-continuous-movement training data sets is measured during a period of performing1D continuous movement by a thumb finger and an index finger of the corresponding wearer. The steps of method to train the ML model ML3 are fully described as follows.

Figure 12A:
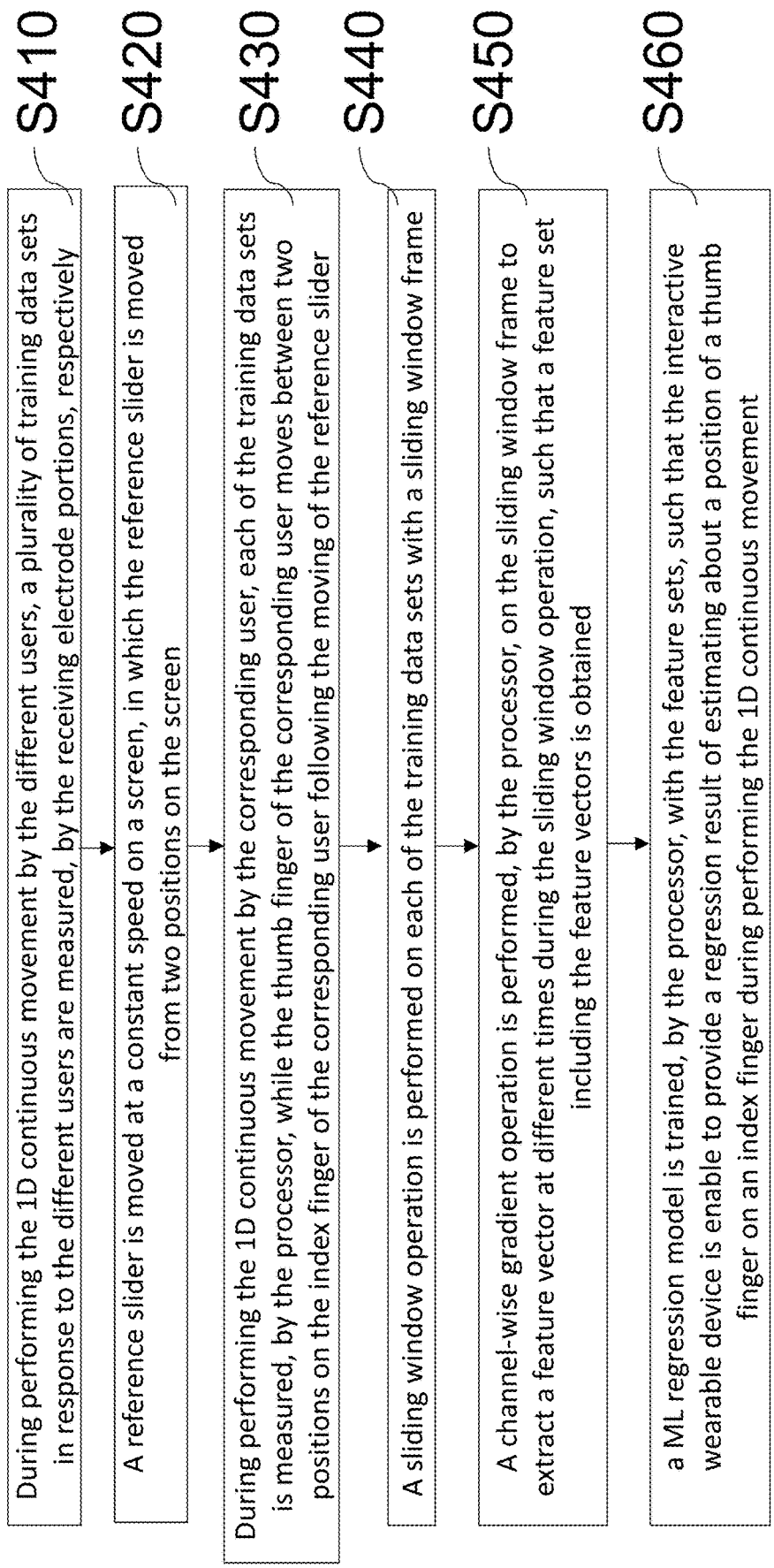
FIG. 12A depicts a step flow chart of a training method for training the second ML model according to an embodiment of the present invention.
Figure 12B:
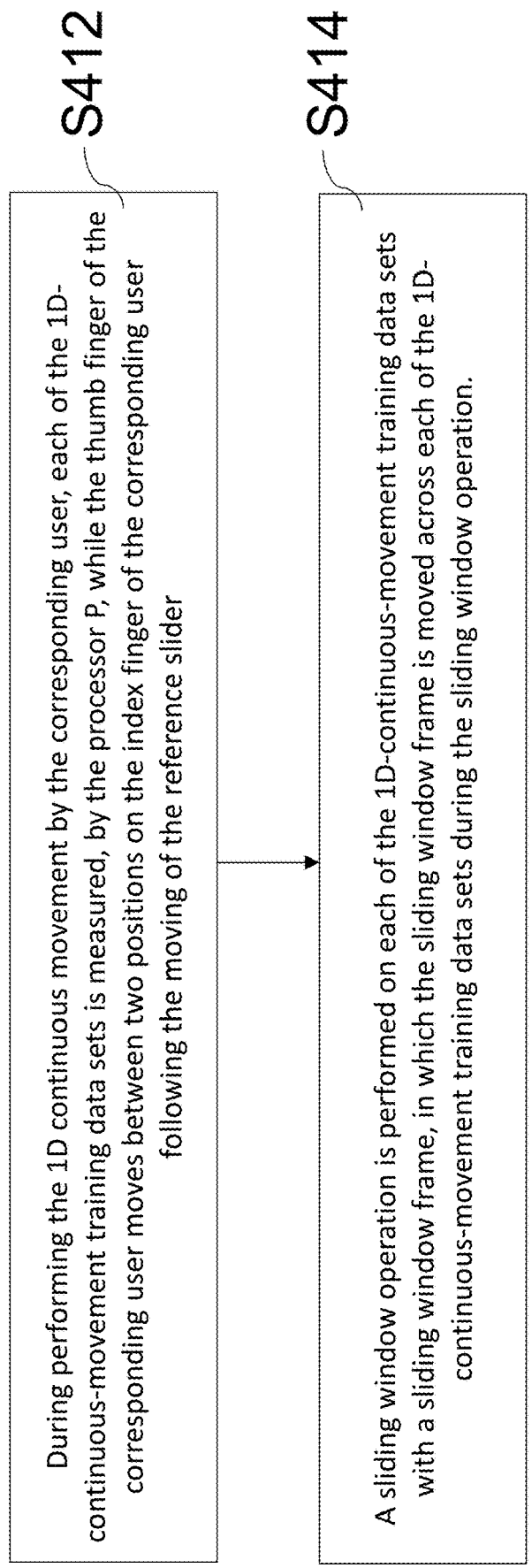
FIG. 12B depicts a step flow chart of a step S410 of the training method for training the second ML model according to an embodiment of the present invention.
Figure 13:
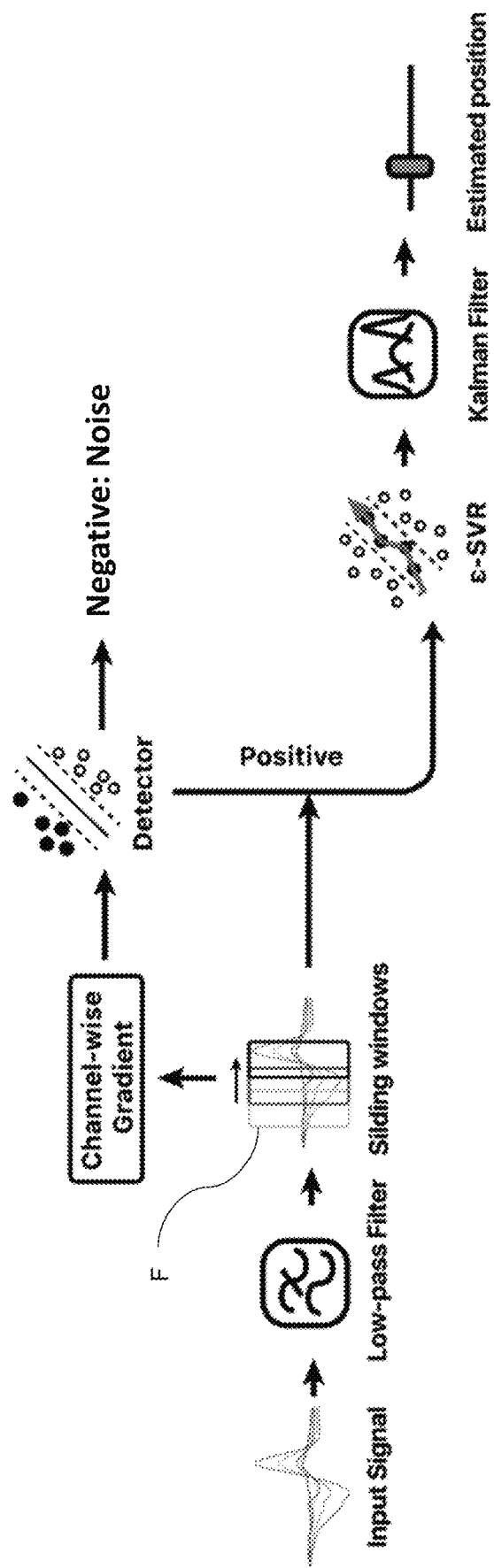
FIG. 13 depicts a pipeline diagram in the FIG. 12A.

FIG. 12A depicts a step flow chart of a training method for training the second ML model ML2 according to an embodiment of the present invention. FIG. 12B depicts a step flow chart of a step S410 of the training method for training the second ML model ML2 according to an embodiment of the present invention. FIG. 13 depicts a pipeline diagram in the FIG. 12A.

Referring to FIGS. 12A and 13, in the step S410: during a period of performing the 1D continuous movement by the different wearers, a plurality of 1D-continuous-movement training data sets in response to the different wearers are measured, by the receiving electrode portions RP, respectively. To be more specific, the step S410 further includes two steps S412, S414.

Referring to the FIG. 12B, in the step S412: A reference slider is moved at a constant speed on a screen, in which the reference slider is moved from two positions on the screen. The position information of the two positions on the screen in the step S412 is also recorded. In detail, an experiment facilitator firstly shows a 600-pixel-long reference slider with its handle gradually moving in a constant speed (400 pixels/second) on the screen.

In the step S414: during a period of performing the 1D continuous movement by the corresponding wearer, each of the 1D-continuous-movement training data sets is measured, by the processor P, while the thumb finger of the corresponding wearer moves between two positions on the index finger of the corresponding wearer following the moving of the reference slider. In some embodiments, the two positions on the index finger are, for example, the distal of the index finger and a middle phalanx of the index finger, and the tip of the distal phalanx serves as a starting point during a period of performing1D continuous movement.

Then, in some embodiments, each of the 1D-continuous-movement training data sets is filtered, by a low-pass filter, to remove circuit noise after the step S410.

In the step S420: a sliding window operation is performed on each of the 1D-continuous-movement training data sets with a sliding window frame F (see FIG. 13), in which the sliding window frame F is moved across each of the 1D-continuous-movement training data sets during the sliding window operation. In detail, during the sliding window operation, the processor P applies a sliding window frame F with the step size of 5 ms (1 frame) across the training data set (16 ms, 3-frames).

In the step S430: a channel-wise gradient operation is performed, by the processor P, on the sliding window frame F to extract a feature vector at different times during the sliding window operation, such that a feature set including the feature vectors is obtained.

In the step S440: a ML regression model is trained, by the processor P, with the feature sets, such that the interactive wearable device 100 is enable to provide a regression result of estimating about a position of a thumb finger on an index finger during a period of performing the 1D continuous movement. In some embodiments, the ML regression model is a k-nearest neighbors (KNN) model (k=5), an Epsilon-Support Vector Regression ($\epsilon$-SVR, RBF kernal, C=0.1, g=1) model, or a small multilayer perceptron (MLP) model.

Then, in some embodiments, a customized Kalman Filter is employed to smooth out the regression result.

In addition, various hand sizes and finger lengths of different wearers could affect the ranges of the signal values while wearers moving the thumb along the index finger. For wearers who have a higher ratio of a wearer's thumb width to his/her index finger length (i.e., large thumb over short index finger), the moving range is smaller, and the sensor signal range is also smaller, and vice versa. To reduce the effect of this problem, in some embodiments, a personalized model is a normalized/calibrated generic model with the aforesaid parameters taken into consideration.

FIG. 14 shows a result of mean squared error (MSE) of each regression model. To examine the smoothness of the simulated real-time tracking, the 2nd derivative of the regression result after applying our customized Kalman Filter. A smaller 2nd derivative value reveals a smoother regression result. Tables (a), (b) in the FIG. 14 show result of our experiments on the generic models and the personalized models respectively. For the generic models, $\epsilon$-SVR model shows the smallest MSE, while MLP model has the smoothest prediction. Although MLP model shows the best smoothness, it relies on large data for a better convergence. In practice, it is reasonable to collect a small amount of data from a new wearer for calibration. Such calibration data may also be used for training a personalized model for a better performance.

By the assistance of the classification ML model, a first and a second ML models, the interactive wearable device analyzes a movement event caused by two fingers of an wearer. The analysis process is fully described as follows.

Figure 15:
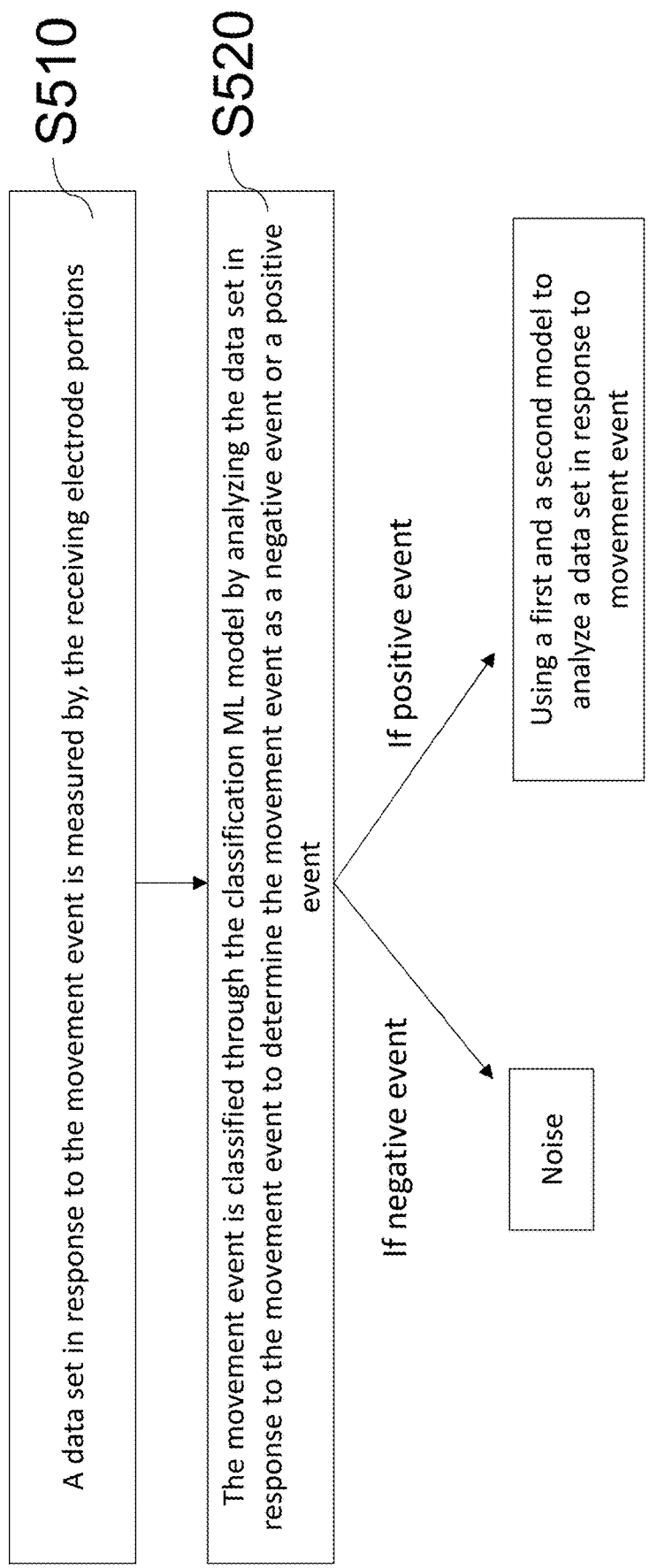
FIG. 15 depicts a step flow chart of an analysis process of the interactive wearable device.

FIG. 15 depicts a step flow chart of an analysis process of the interactive wearable device 100.

Referring to the FIG. 15, as an wearer wears on the detector DD through his/her index finger, a movement event caused by the index finger and the thumb finger is detected/measured by the detector DD. Referring to FIG. 15, specifically, in the step S510: A data set in response to the movement event is measured by, the receiving electrode portions RP.

In the step S520, the movement event is classified through the classification ML model by analyzing the data set in response to the movement event, so as to determine if the movement event is a negative event or a positive event. A sliding window operation and a channel-wise gradient operation, which are similar to the steps S340, S350, are performed on the data set, and the descriptions are not repeated herein. Thus, a feature set including feature vectors in response to the movement event is determined. The processor P compares the feature set in response to the movement event and the negative feature set in response to the negative movement event through the classification ML model CM to determine if the movement event is a negative event or a positive event.

If the movement event is classified as the negative event, then the movement event is analyzed to be noise (as shown in the FIG. 13), and if the movement event is classified as the positive event, then the movement event is analyzed according to the first and second ML models ML1, ML2.

In some embodiments, the data set in response to the movement event is analyzed/processed by the processor P by performing the steps similar to the steps S210 to S280, and the interactive wearable device 100 determines a microgesture of the movement event to be classified as one of the microgestures (a)~(i) in FIG. 6 through the first ML model ML1.

In some embodiments, the data set in response to the movement event is analyzed/processed by the processor P by performing the steps similar to the steps S420, S430 to obtain an estimate result of continuous 1D tracking of the thumb's position on the index through the second ML regression model ML2.

Based on above, in the embodiments of the present invention, an interactive wearable ring-formed device is provided. The interactive wearable device adopts electric field sensing technology due to its potentially high sensitivity to detect a movement event caused by two fingers of an wearer. The detector of the interactive wearable device includes three electrode layers, which are, a receiving electrode layer, a transmitting electrode layer, and a ground electrode layer. Each of the electrode layers is arranged along a corresponding curved path. Thus, when a wearer wears the detector through his/her finger, the shape of the electrode layer can better fit the shape of the finger, which is advantageous to improve signal accuracy in response to the movement event.

Also, the interactive wearable device is trained to by at least two ML based methods for recognizing known one or more microgestures and continuous 1D tracking of the thumb's position on the index finger, respectively. In some embodiments, steps of performing channel-wise gradient operation and temporal gradient operation are applied to a training method of a first ML model related to recognize known one or more microgestures, so as to obtain final feature sets for training the first ML model. In some embodiments, steps of performing sliding window operation and channel-wise gradient operation are applied to a training method of a second ML model related to continuous 1D tracking of the thumb's position on the index finger, so as to obtain final feature sets for training the second ML model. Thus, the interactive wearable device adopting the first and second ML models shows an excellent accuracy in recognizing known microgestures or tracking 1D tracking of the thumb's position.

The functional units and modules of the devices and methods in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present invention. Computer instructions or software codes running in the computing devices, computer processors, or programmable logic devices can readily be prepared by practitioners skilled in the software or electronic art based on the teachings of the present invention.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. An interactive wearable device for analyzing a movement event caused by a first and a second fingers of a wearer, the interactive wearable device comprising:
    a ring body comprising a top insulating layer, a bottom insulating layer, and an intermediate insulating layer disposed in between the top and the bottom insulating layers; and
    a detector comprising a receiving electrode layer disposed in between the top and the intermediate insulating layers, a transmitting electrode layer disposed in between the intermediate and the bottom insulating layers, and a ground electrode layer embedding in the bottom insulating layer and electrically coupled to an electrical ground,
    wherein the receiving electrode layer has a plurality of receiving electrode portions separated from each other and arranged in a matrix and along a curve path,
    wherein the interactive wearable device is configured to analyze the movement event at least according to a variation of a data set in response to the movement event, measured by receiving electrode portions.

2. The interactive wearable device of claim 1, wherein the ring body is detachably worn on the first finger, such that the receiving electrode portions of the receiving electrode layer are arranged around the first finger along the curved path during the movement event.

3. The interactive wearable device of claim 1, further comprising:
    a memory module having a classification machine learning (ML) model configured for classifying the movement event, a first ML model configured for recognizing one or more known microgestures performed by the first and second fingers, and a second ML model configured for providing a regression result of estimating a position of the second finger on the first finger in an one-dimensional (1D) continuous movement performed by the first and second fingers; and
    a processor coupled to the detector and the memory module, wherein the processor is configured with processor-executable instructions to perform operations comprising:
        classifying the movement event through the classification ML model to determine if the movement event is a negative event or a positive event; and
        if the movement event is classified as the negative event, then the movement event is analyzed to be noise;
        if the movement event is classified as the positive event, then the data set in response to the movement event is analyzed according to at least one of the first and second ML models.

4. The interactive wearable device of claim 3, wherein the classification ML model is trained with at least one of negative training data sets in response to the negative event, and is trained with at least one of positive training data sets in response to the positive event.

5. The interactive wearable device of claim 3, wherein the negative event comprises a separate event of the two fingers or a staying-still event of the two fingers.

6. The interactive wearable device of claim 3, wherein the first ML model is trained with a plurality of microgesture training data sets in response to one or more discrete known microgestures, and the second ML model is trained with a plurality of continuous movement training data sets in response to different 1D continuous movements.

7. The interactive wearable device of claim 1, wherein the ring body is shaped so as to equip on the index finger.

8. The interactive wearable device of claim 1, wherein the receiving electrode portions of the receiving electrode layer are concentrically disposed with each other.

9. A machine learning (ML) based training method to train a wearable device for recognizing one or more known microgestures performed by two different fingers, comprising:
    measuring, by a plurality of separated receiving electrode portions of the wearable device arranged in a matrix and along a curve path, one or more microgesture training data sets in response to the known one or more microgestures, respectively;
    performing, by a processor of the wearable device, a channel-wise gradient operation on each of the microgesture training data sets, so as to extract a channel-wise gradient feature set in response to the corresponding known microgesture;
    performing, by the processor of the wearable device, a temporal gradient operation on each of the microgesture training data sets, so as to extract a temporal gradient feature set in response to the corresponding known microgesture;
    determining, by the processor of the wearable device, a final feature set in response to the corresponding known microgesture, according to at least one of the corresponding channel-wise gradient feature set and the corresponding temporal gradient feature set; and training, by the processor, a ML model with the final feature sets, such that the wearable device is enable to recognize the known microgestures in response to the final feature sets through the ML model.

10. The method of claim 9, wherein each of the microgesture training data sets comprises a plurality of gesture samples, each of the gesture samples comprises N measurement frames, and each of the measurement frames comprises a plurality of electrical output signals measured by the receiving electrode portions, respectively.

11. The method of claim 10, wherein in the step of performing the channel-wise gradient operation,
the channel-wise gradient operation is performed, by the processor, on any two of the electrical output signals of each of the measurement frames of the each of the gesture samples, so as to extract the channel-wise gradient feature set in response to the corresponding known microgesture.

12. The method of claim 10, wherein in the step of performing the temporal gradient operation,
the temporal gradient operation is performed, by the processor, on each of the electrical output signals in each of the measurement frames of each of the gesture samples, so as to extract the temporal gradient feature set in response to the corresponding known microgesture.

13. The method of claim 10, wherein each of the measurement frames is measured at a timestamp by the receiving electrode portions, and N is a positive integer.

14. The method of claim 10, wherein before the steps of performing the channel-wise gradient operation and the temporal gradient operation, the method further comprising:
for each of the microgesture training data sets,
denoising each of the gesture samples; and
performing a Fourier re-sampling operation on each of the denoised gesture samples.

15. The method of claim 9, wherein before the step of training the ML model, further comprising:
selecting the ML model, by the processor, according to a signal type of the final feature set.

16. A machine learning (ML) based training method to train a wearable device to track a position of a thumb finger on an index finger during a period of performing a one-dimensional (1D) continuous movement by the thumb finger and the index finger, the method comprising:
during a period of performing the 1D continuous movement by the different wearers, measuring, by a plurality of separated receiving electrode portions of the wearable device arranged along a curve path, a plurality of 1D-continuous-movement training data sets in response to the different wearers, respectively;
performing, by a processor of the wearable device, a sliding window operation on each of the 1D-continuous-movement training data sets with a sliding window frame, wherein the sliding window frame is moved across each of the 1D-continuous-movement training data sets during the sliding window operation;
performing, by the processor of the wearable device, a channel-wise gradient operation on the sliding window frame to extract a feature vector at different times during the sliding window operation, such that a feature set including the feature vectors is obtained; and
training a ML regression model, by the processor of the wearable device, with the feature sets, such that the wearable device is enable to provide a regression result of estimating about a position of the thumb finger on the index finger during a period of performing the 1D continuous movement.

17. The method of claim 16, wherein the step of measuring the 1D-continuous-movement training data sets, the method further comprising:
moving a reference slider at a constant speed on a screen, wherein the reference slider is moved from a first position to a second position on the screen; and
measuring each of the 1D-continuous-movement training data sets, by the processor, while the thumb finger of the corresponding wearer moves between two positions on the index finger of the corresponding wearer following the moving of the reference slider.

18. The method of claim 17, wherein the ML regression model is trained with the feature sets and a ground-truth information about position information of the first and second positions on the screen.

19. The method of claim 17, wherein the ML regression model comprises a k-nearest neighbors (KNN) model, an Epsilon-Support Vector Regression ($\epsilon$-SVR) model, or a small multilayer perceptron (MLP) model.

* * * * *